United States Patent
Hickox et al.

(10) Patent No.: US 10,686,741 B2
(45) Date of Patent: *Jun. 16, 2020

(54) METHOD AND SYSTEM FOR REAL-TIME BLOCKING OF CONTENT FROM AN ORGANIZATION ACTIVITY TIMELINE

(71) Applicant: salesforce.com, inc., San Francisco, CA (US)

(72) Inventors: Eli Spencer Hickox, San Francisco, CA (US); Christianne Brittany Dennison, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/638,139

(22) Filed: Jun. 29, 2017

(65) Prior Publication Data

US 2019/0005454 A1  Jan. 3, 2019

(51) Int. Cl.
*G06Q 10/10* (2012.01)
*H04L 12/58* (2006.01)
(Continued)

(52) U.S. Cl.
CPC ............ *H04L 51/12* (2013.01); *G06F 3/1275* (2013.01); *G06F 40/166* (2020.01); *G06Q 10/06* (2013.01); *G06Q 10/103* (2013.01); *G06Q 10/107* (2013.01); *H04L 63/0227* (2013.01); *H04L 63/101* (2013.01); *H04L 63/108* (2013.01); *H04L 65/1079* (2013.01)

(58) Field of Classification Search
CPC .... G06Q 10/107; G06Q 10/103; G06Q 10/06; G06F 17/24; G06F 3/1275; H04L 51/12; H04L 63/101; H04L 65/1079; H04L 63/0227
See application file for complete search history.

(56) References Cited

U.S. PATENT DOCUMENTS 5,577,188 A   11/1996   Zhu
5,608,872 A   3/1997   Schwartz et al.
(Continued)

OTHER PUBLICATIONS

United States Patent and Trademark Office, Non-Final Office Action in U.S. Appl. No. 15/638,143, dated Oct. 4, 2019.

*Primary Examiner* — Benjamin R Bruckart
*Assistant Examiner* — Akshay Doshi
(74) *Attorney, Agent, or Firm* — LKGlobal | Lorenz & Kopf, LLP

(57) ABSTRACT

Methods and systems are provided for real-time blocking of content from an organization activity timeline of an organization. The content blocked can be, for example, activities, or contributions to those activities. The organization activity timeline is displayed within a user interface to show activities involving a particular external contact and one or more users of the organization. The disclosed methods and systems can be used to control which activities or contributions to activities are displayed in the organization activity timeline. One or more identifiers can be added to one or more blacklists. New activities are evaluated for inclusion in the organization activity timeline. Any new activity that includes an identifier (or contributions to that new activity) can be blocked so that it does not appear in the organization activity timeline.

8 Claims, 24 Drawing Sheets

(51) Int. Cl.
*H04L 29/06* (2006.01)
*G06F 40/166* (2020.01)
*G06Q 10/06* (2012.01)
*G06F 3/12* (2006.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,676,903 B2 | 3/2014 | Bansal |
| 9,256,739 B1 | 2/2016 | Roundy |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0198299 A1 | 9/2005 | Beck |
| 2006/0021019 A1 | 1/2006 | Hinton et al. |
| 2006/0212931 A1 | 9/2006 | Shull |
| 2007/0282623 A1 | 12/2007 | Dattorro |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0250947 A1 | 9/2010 | Wong |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |

(56) References Cited

U.S. PATENT DOCUMENTS

| | | |
|---|---|---|
| 2012/0233137 A1 | 9/2012 | Jakobson et al. |
| 2012/0303644 A1* | 11/2012 | Martin, Jr. .......... G06Q 10/109 |
| | | 707/756 |
| 2013/0124400 A1 | 5/2013 | Hawkett |
| 2013/0159319 A1 | 6/2013 | Duan |
| 2013/0174275 A1* | 7/2013 | Micucci ............. H04L 67/1044 |
| | | 726/28 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0276136 A1 | 10/2013 | Goodwin |
| 2013/0304833 A1 | 11/2013 | St. Clair |
| 2014/0195613 A1 | 7/2014 | Ogilvie |
| 2015/0135300 A1 | 5/2015 | Ford |
| 2016/0036872 A1* | 2/2016 | Lappin ................. H04L 65/403 |
| | | 709/204 |
| 2017/0031536 A1* | 2/2017 | Shah ...................... G06Q 50/01 |
| 2017/0063900 A1 | 3/2017 | Muddu |
| 2017/0142140 A1 | 5/2017 | Muddu |

\* cited by examiner

SETUP
Excluded Addresses

To prevent emails and events associated with a particular person or company from being added to Salesforce by Automated Activity Capture, add their email address or domain to the Excluded Addresses list. Make sure your company's domain is added to the list, so your company's internal emails and events aren't added to Salesforce.

Domain or Email (e.g., salesforce.com or astro@trailhead.com)

[ ] Add

If adding a domain, select a type: ○ Internal domain
● External domain

| NAME | TYPE | DOMAIN TYPE | LAST MODIFIED DATE | LAST MODIFIED BY | |
|---|---|---|---|---|---|
| emadiii@lkglobal.com | Email Address | | 9/2/2016 | Admin User | ▷ |
| yahoo.com | Domain | External domain | 8/9/2016 | Admin User | ▷ |
| happy.com | Domain | External domain | 8/9/2016 | Admin User | ▷ |
| salesforce.com | Domain | Internal domain | 8/9/2016 | Admin User | ▷ |

FIG. 3C

| ACTIVITY | CHATTER |

New Task | New Event | Log a Call | Email

[ Create a task... ] [ Add ]

Filter Timeline ▽  [Expand All] [⟳]

Next Steps ----------------------------------------- [More Steps]

No next steps. To get things moving, add a task or set up a meeting.

Past Activity ----------------------------------------------

> ✉ Re: [relateiq/riq-testing] Salesforce Manage Sh... ⊘ 1:33 PM | Today
> ✉ [relateiq/docker-azkaban-solo] Abida add jar m... ⊘ 1:33 PM | Today
> ✉ [relateiq/docker-azkaban-solo] spark 2.0 jars sh... ⊘ 1:32 PM | Today
> ✉ Re: [relateiq/riq] fix(s32): fixing the region for a... ⊘ 1:26 PM | Today
> ✉ [relateiq/riq] fix(s32): fixing the region for awsk... ⊘ 1:26 PM | Today ⎬ 790
> ✉ Re: [relateiq/riq] fix(s32): using the same regio... ⊘ 1:19 PM | Today
> ✉ [relateiq/riq] fix(s32): using the same region (#... ⊘ 1:19 PM | Today
> ✉ Re: [relateiq/riq] Recrawl annie endpoint (#76... ⊘ 1:19 PM | Today

[More Past Activity]

FIG. 7F

Filter Timeline ▽      Expand All   ↻

Next Steps —————————————————————————— More Steps

| 📅 | *This event isn't shared with you.* ...ask to share | 2:30 PM | Jun 12 |

Upcoming Event with Christy Dennison + 9 others.

| 📅 | *This event isn't shared with you.* ...ask to share | 11:00 AM | Jun 7 |

Upcoming Event with Christy Dennison + 3 others.

Past Activity ——————————————————————————

> ✉ Learn JavaScript Frameworks   ◉     10:32 AM | Today    } 794
clarice.estrella@projectmanagementemail.com emailed Eli 2 Hickox > ✉ Change Management Training   ◉     9:32 AM | May 1
olivier.mayer@businessmanagementemail.com emailed Eli 2 Hickox > ✉ Asset Swap   ◉     3:01 PM | Apr 27
Eli 2 Hickox emailed > ✉ The NBA Lover's Guide to Building a SaaS Sale... ◉   1:45 PM | Apr 25
jeremy.boudinet@ambition.com emailed Eli 2 Hickox > ✉ Scrum Master Certification   ◉     10:43 AM | Apr 24
jason.stern@mailer1.prof-cert.com emailed Eli 2 Hickox > ✉ How was your Allset experience so far?   ◉     6:40 AM | Apr 14
chelsea@allsetnow.com emailed Eli 2 Hickox > ✉ Test stream blocking   ◉     9:43 AM | Apr 11
Eli 2 Hickox emailed Elias Cox > ✉ The Top 12 Tools to Maximize Salesforce Data   ◉     5:15 AM | Apr 11
jeremy.boudinet@ambition.com emailed Eli 2 Hickox More Past Activity

FIG. 7I

METHOD AND SYSTEM FOR REAL-TIME BLOCKING OF CONTENT FROM AN ORGANIZATION ACTIVITY TIMELINE

TECHNICAL FIELD

Embodiments of the subject matter described herein relate generally to cloud-based computing. More particularly, embodiments of the subject matter relate to methods and systems for real-time content blocking and privacy management within an activity timeline of an organization of a cloud-based computing environment.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider.

Multi-tenant cloud-based architectures have been developed to improve collaboration, integration, and community-based cooperation between customer tenants without compromising data security. Generally speaking, multi-tenancy may refer to a system where a single hardware and software platform simultaneously supports multiple customers or tenants from a common data storage element (also referred to as a "multi-tenant data store"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software between multiple sets of users.

A cloud-based computing environment can include a number of different data centers, and each data center can include a number of instances, where each instance can support many tenants (e.g., 10,000 tenants or more). As such, large numbers of tenants can be grouped together into and share an instance as tenants of that instance. Each tenant has its own organization (or org). An organization or "org" is a unique identifier (ID) that represents that tenant's data within an instance. Each identifier defines a virtual or logical space provided to an individual tenant (e.g., a defined set of users) where all of that tenant's data and applications are stored within an instance so that it is separate from that of all other organizations that are part of that instance. An organization can be thought of as a logical container for one cohesive set of related data, metadata, configurations, settings and schemas that is separate from that of all other organizations. Each organization can be highly customized with respect to other organizations that are part of the same instance, and can include custom fields, custom objects, workflows, data sharing rules, visual force pages and apex coding because even though all tenants with an instance share the same database, the organization ID is stored in every table to ensure that every row of data is linked back to the correct tenant and the data from other tenants sharing the same instance cannot be mixed up.

Recently, a new activity timeline feature has been developed that allows users within an organization to view of an external contact's activities over time. This "organization activity timeline" can collect the most recent activities associated with a particular external contact together, and display them as a visual component in a user interface that arranges past activities and upcoming or future activities chronologically across a dimension of time. By displaying a record of activities in the organization activity timeline, user's within the organization can better understand information about another person or entity that is external to the organization.

Each activity that is displayed in the organization activity timeline has at least one contributor who is a particular user within the organization. Currently, contributions by any user within the organization who contributes to an activity are displayed within the organization activity timeline.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3C is a screenshot that shows another example of a blacklist control panel that can be used by an administrator of an organization to define and manage various blacklists in accordance with the disclosed embodiments.

FIG. 7F is a screenshot that shows an example of an organization activity timeline for notifications@github.com before an administrator adds the external domain github.com to an organization-level external domain blacklist in accordance with the disclosed embodiments.

FIG. 7I is a screenshot that shows an example of the organization activity timeline for eli@salesforceiq.com after an administrator adds the internal domain salesforceiq.com to the organization-level internal domain blacklist in accordance with the disclosed embodiments.

DETAILED DESCRIPTION

Figure 1:
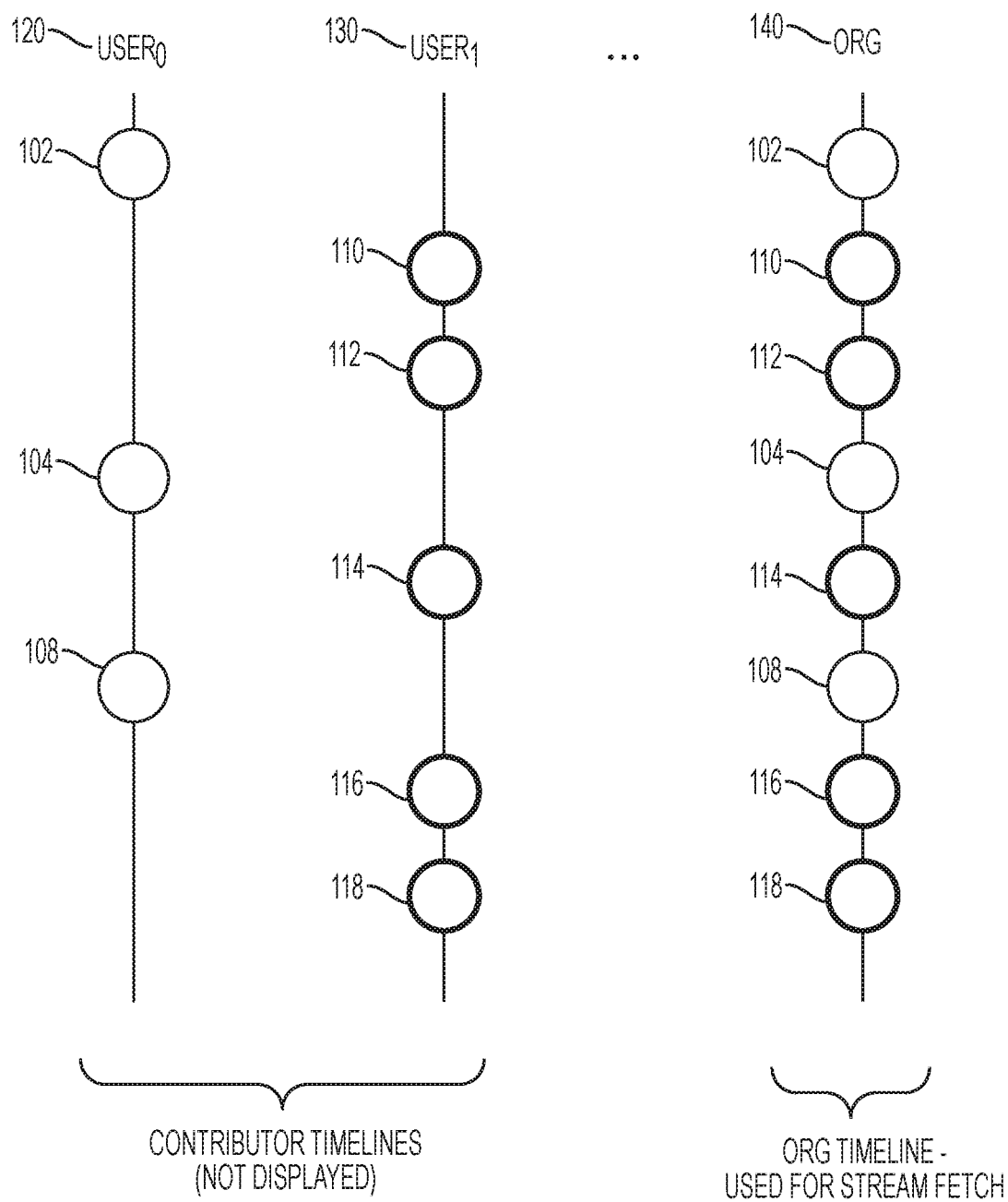
FIG. 1 is a schematic diagram of simplified representations of contributor activity timelines and an organization activity timeline in accordance with the disclosed embodiments.

The exemplary embodiments presented here relate to systems, methods, procedures, and technology for content blocking and privacy management within an activity timeline of an organization of a cloud-based computing environment. The described subject matter can be implemented in the context of any cloud-based computing environment including, for example, a multi-tenant database system.

To help provide a degree of privacy, it would be desirable to provide users within the organization with solutions that can allow them to control which contributions and activities (e.g., events) appear within the organization's activity timeline. It would be desirable to provide administrators of the organization with solutions that can allow them to control or block which activities appear within the organization's activity timeline.

To address the issues discussed above, the disclosed embodiments can thus provide a retroactive, retro-reactive, real-time content blocking and privacy management systems and methods for an activity timeline. To do so, various blacklists can be defined by a user or administrator of an organization. Examples of these blacklists can include: a user-level blacklist that can be defined by a user, an organization-level blacklist can be defined by the administrator, an organization-level external domain blacklist that can be defined by the administrator, and an organization-level internal domain blacklist that can be defined by the administrator. The various blacklists can be maintained within a distributed database management system, and cached for fast read speeds so that thousands of incoming activities per second can be analyzed by the system. User blacklists are shared by an organization and a user. Organization blacklists are shared by the organization. As activities come into the activity timeline, blacklist rules associated with each blacklist are applied. All of this happens in near real-time via a real-time activity processing framework that will be described in greater detail below. With each unique blacklist, the system ensures individual and organizational privacy, while also ensuring the quality of any downstream analysis or reporting with the use or the internal domain blacklist.

In one embodiment, a user-level blacklist can be defined by a user. The user can add a contact identifier (e.g., an email address) to a user-specific blacklist that will prevent the user's individual contribution from showing up in organization-wide activity timelines for any given contact. In the base use case, meaning an activity (e.g., an email or a calendar meeting) has a single contributor, the contributor's contribution is removed and the activity simply does not appear in the organization-wide activity timeline for the contact in question. In a more complex use case, an activity will have multiple contributors. For example, an email destined to multiple users. If the only one user adds the contact identifier in question to his or her blacklist, the activity corresponding to that email would still show up in the organization-wide activity timeline for the contact.

For example, if an activity contains a contribution belonging to an email in a user's blacklist, that contribution will not make it to the organization-wide activity timeline. For instance, if a user, named Bob, of an organization adds the email alice@somecompany.com to his blacklist, when other users of Bob's organization view the activity timeline for Alice's contact, any emails where Bob was the sole contributor to an email to alice@somecompany.com will not show up for other users in the organization. If there are more contributors to the email, Bob's contribution will be removed, while maintaining the contributions from other users. So, if other users do not have alice@somecompany.com in their respective blacklists, activities corresponding to that email address will be displayed for other users in the organization.

Additionally, when a user adds any given contact identifier (e.g., an email address) to his or her blacklist, activities corresponding to that contact identifier will be retroactively "scrubbed" from the activity timeline. All of the scrubbing operations happen in real time. The privacy management systems and methods are retroactive, in that scrubbing operations can be performed to remove past activities from the activity timeline.

The user can also remove a contact identifier from a user-level (or user-specific) blacklist, and the scrubbing operation can be performed in reverse. For example, if the user removes the contact identifier from his or her blacklist, the contribution (or activity) will be retro-reactively added back to the organization-wide activity timeline. As such, the privacy management systems and methods are retro-reactive, in that the user's blacklist operations can be performed in reverse over past activities.

In another embodiment, an organization-level blacklist can be defined by an administrator of an organization. When an administrator adds a contact identifier to the organization-level blacklist, the system can perform a similar type of activity scrubbing, but rather than removing any user's contributions, any activities that include a contribution belonging to a contact identifier (e.g., an email address) that is included in the organization-level blacklist will be hard-deleted with no possibility of it coming back. In addition, if an activity contains a contribution belonging to a contact identifier (e.g., an email address) that is included in the organization-level blacklist, that activity will not make it to the organization-wide activity timeline, and can not be added back into the organization-wide activity timeline.

In another embodiment, an organization-level external domain blacklist can be defined by an administrator. When an administrator adds an external domain to the organization-level blacklist, the system can perform a similar type of activity scrubbing, but rather than removing any user's contributions, any activities that include one or more contributions belonging to an external domain (that is included in the organization external domain blacklist) will be hard-deleted with no possibility of coming back. In addition, if an activity contains one or more contributions belonging to an external domain (that is included in the organization external domain blacklist), that activity will not make it to the organization-wide activity timeline, and can not be added back into the organization-wide activity timeline.

In another embodiment, an organization-level internal domain blacklist can be defined by an administrator. The administrator can specify the domain of the organization, along with any alias domains the organization may use, to define the organization-level internal domain blacklist. When an administrator adds an internal domain to the organization-level internal blacklist, the system can perform a past activity scrubbing operation where past activities are evaluated. Any activities that has all of its contributions belonging to the internal domain (that is included in the organization internal domain blacklist) will be hard-deleted with no possibility of coming back. In other words, for a particular past activity, if it is determined that all contributions to that past activity belong to a contributor with the internal domain in the organization-level internal domain blacklist, then that past activity will be removed from the organization-wide activity timeline, with no possibility of it coming back. When a new activity is evaluated for inclusion in the organization-wide activity timeline, and all of an activity's contributions belong to an internal domain in the organization-level internal domain blacklist, then that activity will not make it to the organization-wide activity timeline, with no possibility of it coming back. In other words, if all contributions to the activity belong to an internal domain (that is included in the organization internal domain blacklist), that activity will not make it to the organization-wide activity timeline, and can not be added back into the organization-wide activity timeline. This internal domain blacklist is useful for enhancing the quality of data used for downstream reporting because any downstream reporting systems, which would depend on the activity timeline for data, are not clouded with noise (e.g., internal emails with nothing to do with customer communication).

Prior to describing exemplary embodiments with reference to FIGS. 1-11 certain terminology will be defined.

Multi-Tenant Database System

As used herein, the term "multi-tenant database system" may refer to those systems in which various elements of hardware and software of the database system may be shared by one or more tenants. For example, a given application server may simultaneously process requests for a great number of tenants, and a given database table may store rows for a potentially much greater number of tenants. In a multitenant architecture a number of tenants share IT resources such as database servers, application servers, and infrastructure required to run applications, resulting in an environment where resources are managed centrally.

Data Center and Instances

A cloud-based computing environment can include a number of different data centers. Each data center can include a number of instances. Each instance can support many (e.g., 10,0000) tenants, where each tenant has their own organization (or org).

An instance (also known as a point of deployment (POD)) is a cluster of software and hardware represented as a single logical server that hosts multiple organization's data and runs their applications. An instance can be a self-contained unit that contains all that is required to run an instance including the application server, database server, database itself, search and file system. Large numbers of tenants, for example, 10,000, can be grouped together into and share an instance as tenants of that instance. A platform as a service (PaaS), such as the Force.com platform, can run on multiple instances, but data for any single organization is always stored on a single instance where their data resides. Each tenant is allocated to one and only one instance (or POD) and that is where their data resides. As such, an instance may refer to a single logical server that multiple organizations live on as tenants. An instance can be identified in a URL by a region and a server number. For example, if it is assumed that there are currently 21 instances in North America, in the URL na8.salesforce.com, na8 can refer to particular server, where na may refer to the general location of the server (North America) and 8 may refer to the serverID within that general location (server 8 of 21 in North America).

Organization

An organization or "org" is a unique identifier (ID) that represents that tenant's data within an instance. Each identifier defines a virtual or logical space provided to an individual tenant (e.g., a deployment of Salesforce with a defined set of licensed users) where all of that tenant's data and applications are stored within an instance so that it is separate from that of all other organizations that are part of that instance. As such, each organization can be identified by its own unique ID that allows that organization's data to be separated from data of other organizations. The ID serves as an access key and a security barrier for an individual tenant's data in the system. An organization can be thought of as a logical container for one cohesive set of related data, metadata, configurations, settings and schemas. An organization includes all of a tenant's data and applications, and is separate from that of all other organizations. Each organization can be highly customized with respect to other organizations that are part of the same instance, and can include custom fields, custom objects, workflows, data sharing rules, visual force pages and apex coding because even though all tenants with an instance share the same database, the organization ID is stored in every table to ensure that every row of data is linked back to the correct tenant and the data from other tenants sharing the same instance cannot be mixed up.

Records and Objects

As used herein, the term "record" can refer to a particular occurrence or instance of a data object that is created by a user or administrator of a database service and stored in a database system, for example, about a particular (actual or potential) business relationship or project. An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

Organization Activity Timeline

Users who are part of the organization contribute activities to the system. These users are also referred to as contributors herein. These activities can be displayed in an organization activity timeline view. As used herein, the term "organization activity timeline" may refer to an organization-wide view of an external contact's activities over time. An external contact is another person or entity that is external to the organization. The most recent activities associated with a particular external contact can be collected together, and displayed in an organization activity timeline. For example, a query can be ran based on a contact identifier associated with a particular external contact to generate a visual representation that shows the most recent activities associated with that particular external contact. The organization activity timeline of an organization can include a record of activities each having at least one contributor, where a contributor is a particular user within the organization. The organization activity timeline can be presented as a visual component in a user interface that arranges activities chronologically across a dimension of time. The activities displayed in the organization activity timeline can include past activities and upcoming or future activities.

Activity

As used herein, the term "activity" can refer to a recording of a communication. Examples of such communications can include emails, calendar meetings, phone calls, tasks, changed or deleted meetings, notes, changes to an internal representation of an external person, an internal representation of the need or change of that need to follow-up with an external person, and any others that correspond to a communication between one or more users, and usually involving external people who are not users in the organization. An activity can relate to a particular object, like an opportunity or task, and can include any events that happens within an organization related to a particular external contact. As such, in some cases, the terms "activity" and "event" can be used interchangeably depending on the context. Activities related to objects can be displayed in an organization activity timeline view. For instance, a few non-limiting examples of activities that can be displayed can include activities related to an opportunity, lead, account, contact, and any custom objects on which a user enable activities. The activity timeline can display all activities in a continuum from future to past. For example, in one implementation, from top to bottom, the timeline displays activities in chronological order to today with undated tasks at the top and overdue tasks at the bottom.

Actions

In the activity timeline, a user can define a set of actions that are displayed. The set of actions displayed can be driven off of metadata, specifically page layouts. Actions are configurable for each data object type. For example, various actions can be specified for an opportunity object and any activities related to those various actions for that opportunity object will appear in the activity timeline. For instance, actions such as Log a Call, New Task, New Event, and Email can be displayed on the activity timeline.

Contribution

As used herein, the term "contribution" may refer to input by a user of an organization to an activity. For example, if a user in the organization sends an email to an external contact, that email has a single user contribution. If the user sends the email with another user cc-ed, that email has two user's contributions. For calendar meetings, if two users from the organization are invited as attendees, then the meeting has two contributions. Users can contribute in a variety of ways, one of which is to connect external data sources like their email and calendar accounts, but contributions are not limited to connections to external data source since any recording of communication can be entered manually if there is not a direct link to the source of data to create activities.

Contact Identifier

As used herein, the term "contact identifier" may refer to any identifier associated with a particular contact that can be used to identify that particular contact. In many cases a contact identifier is an email address of that particular contact, but other examples can include a telephone number of the contact, a social media handle of the contact, or any other information that can be used to uniquely identify a particular contact.

FIG. 1 is a schematic diagram of simplified representations of contributor activity timelines 120, 130 and an organization activity timeline 140 in accordance with the disclosed embodiments.

The organization activity timeline 140 provides an organization-wide view of an external contact's activities over time. This organization activity timeline 140 can collect the most recent activities 102, 104, 108, 110, 112, 114, 116, 118 associated with a particular external contact together, and display them as a visual component in a user interface that arranges past activities and upcoming or future activities chronologically across a dimension of time.

The organization activity timeline 140 is generated based on activities from contributor activity timelines 120, 130 that relate to the external contact. In this simplified example, only two contributor activity timelines 120, 130 are shown, but it should be appreciated that an organization would typically include many individual users (e.g., 10,000 or more in some organizations) who could be contributors, and that the activities of each user (or a subset of the users) can be displayed within the organization activity timeline 140. The contributor activity timelines 120, 130 are not displayed, but the activities that make up each contributor activity timeline 120, 130 can be used to define the activities that make up the organization activity timeline 140 that is displayed to users who are part of the organization. This simplified representation of contributor activity timeline 120 includes activities 102, 104, 108 that relate to the external contact, and the simplified representation of contributor activity timeline 130 includes activities 110, 112, 114, 116, 118 that relate to the external contact. The activities from each of the contributor activity timelines 120, 130 can then be displayed within the organization activity timeline 140 so that each user who is a member of the organization has a view of all activities 102, 104, 108, 110, 112, 114, 116, 118 that relate to the external contact. By displaying a record of activities in the organization activity timeline, user's within the organization can better understand information about another person or entity that is external to the organization.

Figure 2:
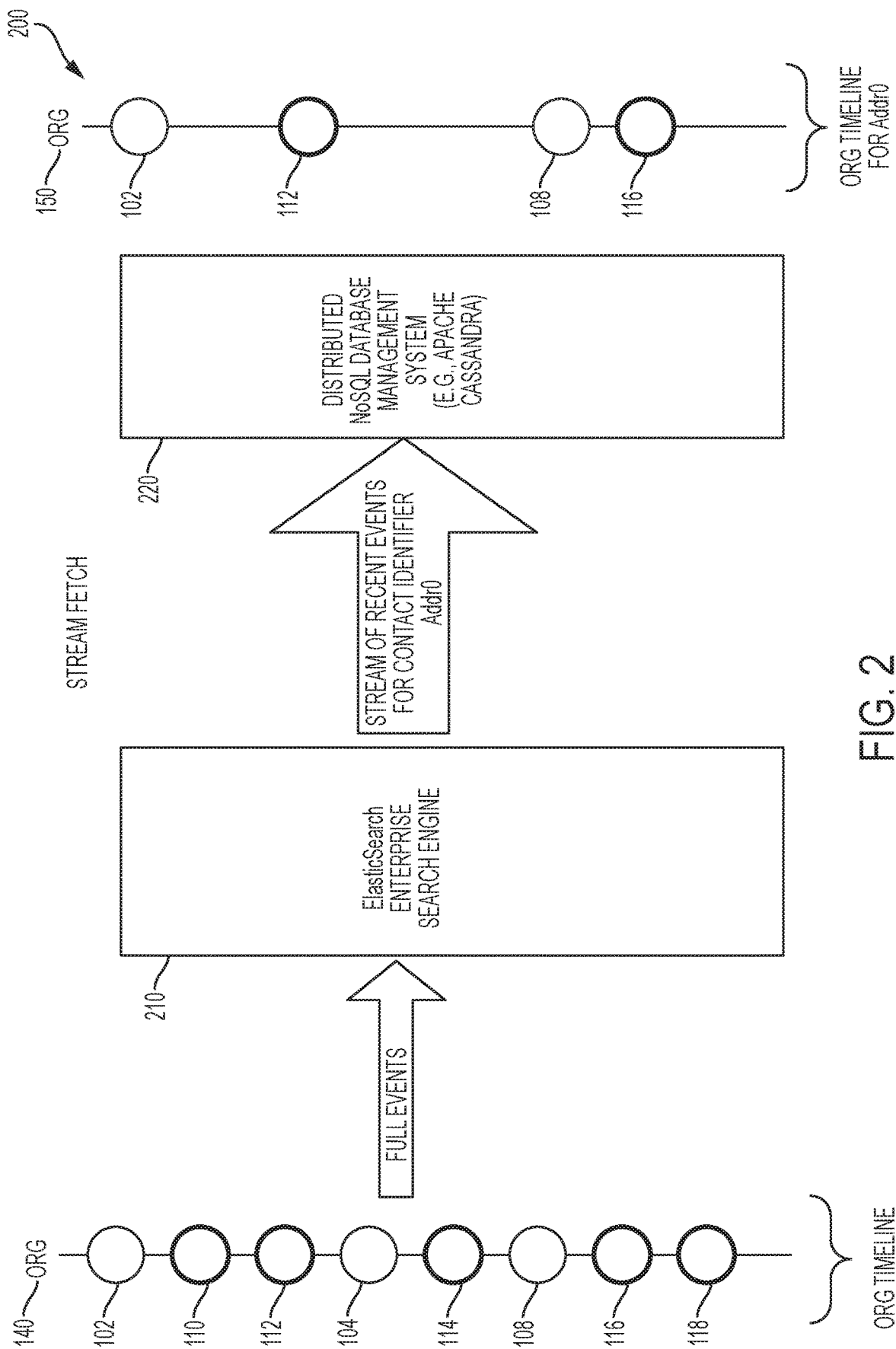
FIG. 2 is a block diagram that illustrates a stream fetch process used to find a stream of recent activities for a particular user from an organization activity timeline in accordance with the disclosed embodiments.

FIG. 2 is a block diagram that illustrates a stream fetch processing system 200 used to find a stream of recent activities for a particular user ($Addr_0$) from the organization activity timeline of FIG. 1 in accordance with the disclosed embodiments. The system 200 includes an enterprise search engine 210 and a distributed database management system 220.

In one embodiment, the enterprise search engine 210 can be implemented using ElasticSearch. Elasticsearch is a flexible and powerful open source, distributed, real-time search and analytics engine based on Lucene. Elasticsearch is developed in Java and is released as open source under the terms of the Apache License. It provides a distributed, multitenant-capable full-text search engine with an HTTP web interface and schema-free JSON documents. It provides scalable search, has near real-time search, and supports multitenancy. Elastiscsearch was built from the ground up for use in distributed environments where reliability and scalability are important. Elasticsearch enables comprehensive searches well beyond simple full-text search, and can be used to search all kinds of documents. Elasticsearch includes a robust set of APIs and query DSLs, as well as clients that support a variety of programming languages.

In one embodiment, the distributed database management system 220 can be implemented using Apache Cassandra database management system. Apache Cassandra is a free and open-source distributed NoSQL database management system designed to handle large amounts of data across many commodity servers, providing high availability with no single point of failure. Cassandra offers robust support for clusters spanning multiple datacenters, with asynchronous masterless replication allowing low latency operations for all clients.

For example, the enterprise search engine 210 can be used to search the various activities 102, 104, 108, 110, 112, 114, 116, 118 from the organization activity timeline 140 to find and fetch a subset of partial objects associated with that contact identifier ($Addr_0$) from the organization activity timeline 140. The partial objects can then be used to fetch a stream of full activity objects 102, 112,108, 116 associated with that contact identifier ($Addr_0$) from the distributed database management system 220.

For example, in one embodiment, an Elasticsearch engine 210 can be queried (e.g., by date ranges) to obtain indexed events that contain sparse information about activities and their contributions (e.g., high level details of an email). The distributed database management system 220 can be partitioned, for example, with a composite primary key composed of an organization identifier (orgId) and a user identifier (userId) such that all of an organization's data is on a single partition to optimize read performance. Based on the indexed events, the distributed database management system 220 can be queried to populate activity metadata for activities (e.g., bodies of an email).

The set of full activity objects (or activities) from the distributed database management system 220 can then be sent as a stream of recent activities 102, 112,108, 116 to the client (not shown). The set of full activity objects (or activities) make up an activity timeline 150 for that contact identifier ($Addr_0$).

Figure 3A:
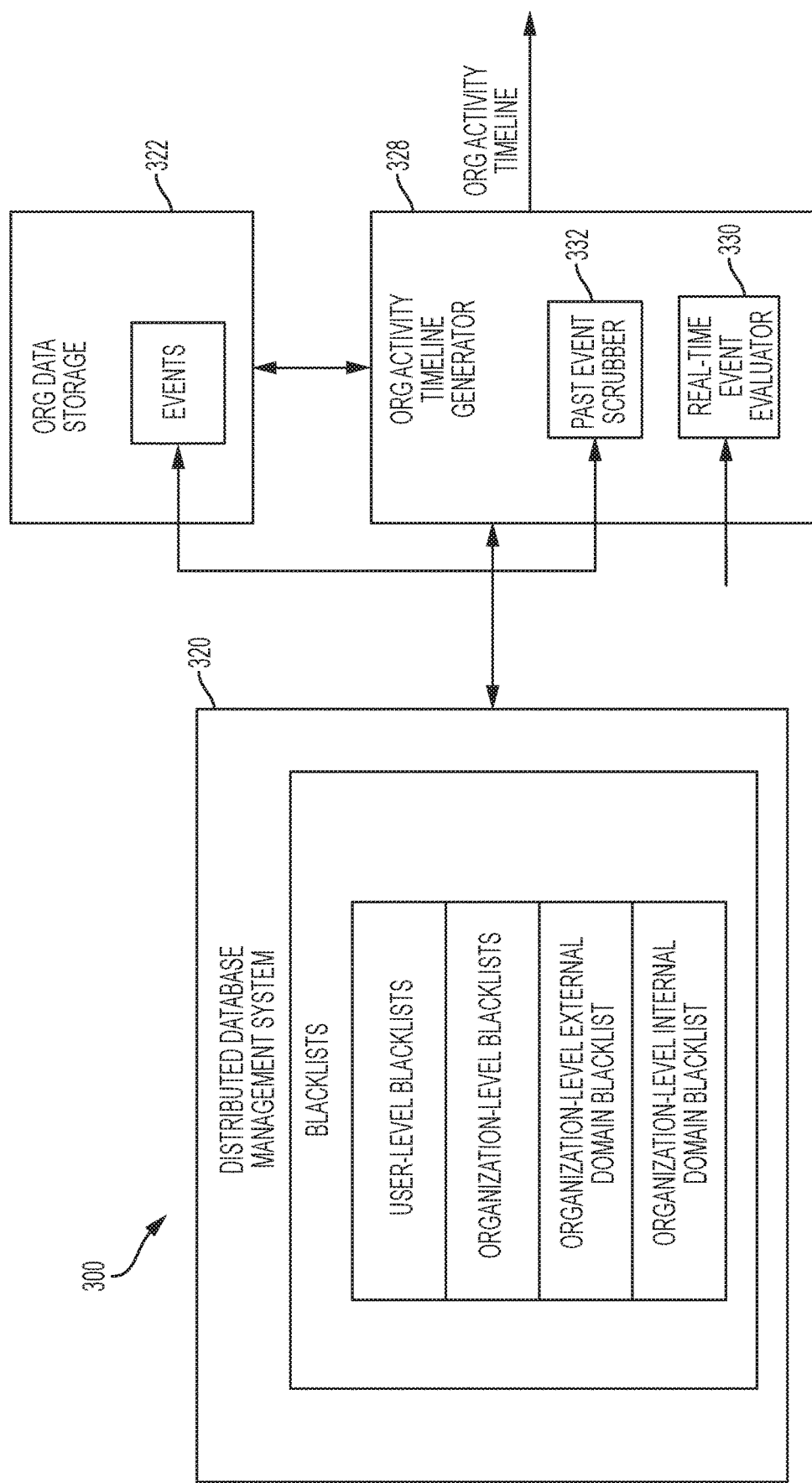
FIG. 3A is a block diagram that illustrates a management system for generating an organization activity timeline for an organization in accordance with the disclosed embodiments.

FIG. 3A is a block diagram that illustrates a management system 300 for generating an organization activity timeline for an organization in accordance with the disclosed embodiments. As will be explained in greater detail below with reference to FIGS. 3B-7I, the management system 300 can provide features for real-time content blocking and privacy management within an organization activity timeline, and/or features for retroactive removal of content from the organization activity timeline.

The system 300 includes a distributed database management system (DDMS) 320, data storage 322, and an organization activity timeline generator 328. The DDMS stores a number of different blacklists including user-level blacklists for specific contacts specified by users of the organization, organization-level blacklists for specific contacts specified by the administrator, organization-level external domain blacklists for specific external domains specified by the administrator, and organization-level internal domain blacklists for specific internal domains specified by the administrator. The data storage 322 stores various activities that may appear in the organization activity timeline (depending on application of blacklists).

The organization activity timeline generator 328 includes a real-time activity evaluator 330 and a past activity scrubber 332. The real-time activity evaluator 330 and past activity scrubber 332 apply the various blacklists to restrict activities, or contributions to certain activities, so that they do not appear on the organization activity timeline.

The real-time activity evaluator 330 is an ingestion-time filter that is defined or determined by the blacklists stored at the DDMS 320. The real-time activity evaluator 330 crawls the user's datasources (e.g., their email and calendar accounts) to find new activities (e.g., emails and calendar) to evaluate. After finding the new activities to evaluate from the user's datasources, and before indexing at the enterprise search engine 210 and saving in distributed database management system 220, the real-time activity evaluator 330 can perform real-time evaluation of new activities to determine whether any user's contributions to those activities, or the activities in their entirety, should be blocked from appearing in the organization activity timeline. As will be described in greater detail below with reference to FIGS. 5 and 7A-7D, whether the real-time activity evaluator 330 blocks the entire activity or just certain user's contributions to the activity depends on how many contributors from the organization there are to the activity and the particular blacklist that is applied.

On the other hand, the past activity scrubber 332 can perform scrubbing of past activities or scrubbing of specific user's contributions to those activities. Again, this depends on which blacklists are applied, and how many contributors from the organization there are to each activity. For example, in one embodiment, a multi-year query can be performed via ElasticSearch enterprise search engine 210 to find activities. A real-time activity processing framework (Storm) can then query one week at a time, and the past activity scrubber 332 can perform a scrub operation for a user-level blacklist to remove contributions to activities (or entire activities) so that they will not appear in the organization activity timeline, or can perform a hard-delete operation for various organization-level blacklists to hard-delete of certain activities so that they will not appear in the organization activity timeline. For example, when a user is the sole contributor to an activity and has blocked a specific contact via a user-level blacklist, the past activity scrubber 332 can remove the entire activity so that it will not appear in the organization activity timeline. By contrast, when there are other contributors to a certain activity, the past activity scrubber 332 can simply remove the certain user's contributions to that activity so that the user's contributions do not appear in the organization activity timeline. When organization-level blacklists are applied (and certain constraints are met), the past activity scrubber 332 may completely remove or scrub any past activity so that the past activity does not appear in the organization activity timeline.

Figure 3B:
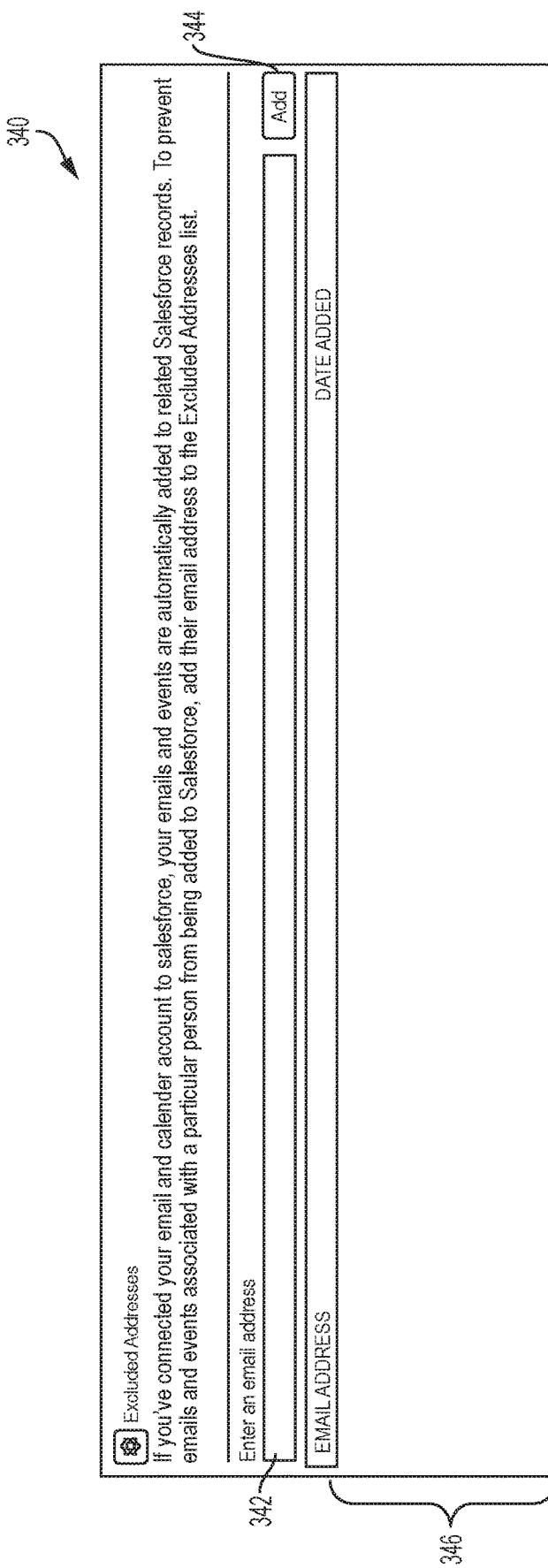
FIG. 3B is a screenshot that shows an example of a user interface element that can be used by any particular user who is a member of an organization to define a user blacklist in accordance with the disclosed embodiments.

FIG. 3B is a screenshot that shows an example of a user interface element 340 that can be used by any particular user who is a member of an organization to define user-level blacklists in accordance with the disclosed embodiments. To do so, the user can enter a contact identifier, such as an email address in the text field 342, and then select the add button 344. The will cause the contact identifier to appear in region 346 along with the date the contact identifier was added.

FIG. 3C is a screenshot that shows another example of a blacklist control panel 350 that can be used by an administrator of an organization to define and manage various blacklists in accordance with the disclosed embodiments. FIG. 3C shows the blacklist control panel 350 after the administrator has defined various organization-level blacklists 362, 364, 366.

The administrator of the organization can create organization-level blacklists for specific contacts by specifying a contact identifier such as an email address. In this particular example, an administrator has defined an organization-level blacklist 362 that includes a contact identifier emadill@lkglobal.com. To define the organization-level blacklist, the administrator can enter the contact identifier in the text field 352, and then select the add button 354. The will cause the contact identifier to appear in region 356 along with the date the contact identifier was added.

In addition, the administrator can also use the blacklist control panel 350 to create or define organization-level external domain blacklists for specific external domains specified by the administrator, and organization-level internal domain blacklists for specific internal domains specified by the administrator. To define organization-level external domain blacklists for specific external domains, the administrator can enter a contact identifier, such as a domain in the text field 352, select a type of domain via radio button 358, and then select the add button 354. The will cause the contact identifier to appear in region 356 along with a type, a domain type, a last modified date that indicates when the contact identifier was added, and a last modified by field that indicates who created or modified the entry. In this example, the administrator has added two external domains, yahoo.com and happy.com, as the organization-level external domain blacklists. Similarly, to define organization-level internal domain blacklists for specific internal domains, the administrator can enter a contact identifier, such as a domain in the text field 352, select a type of domain via radio button 360, and then select the add button 354. The will cause the contact identifier to appear in region 356 along with a type, a domain type, a last modified date that indicates when the contact identifier was added, and a last modified by field that indicates who created or modified the entry. In this example, the administrator has added one internal domain, salesforce.com, as an organization-level internal domain blacklist.

Figure 4A:
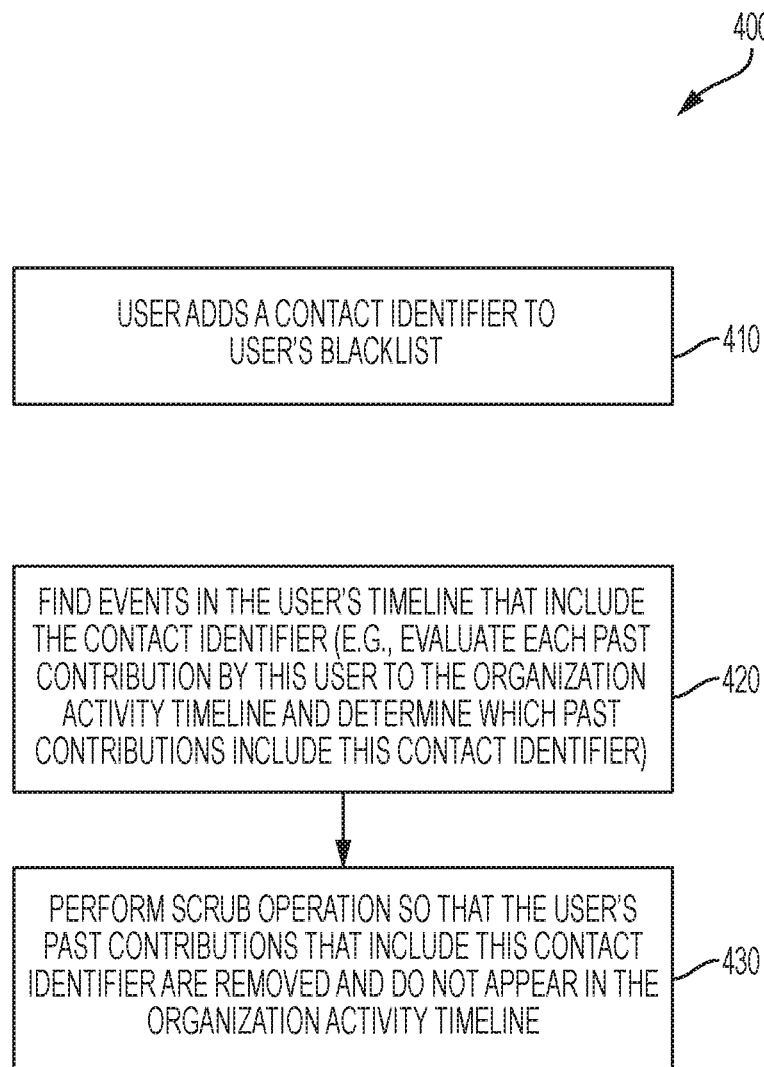
FIG. 4A is a flow chart that illustrates an exemplary method for retroactively scrubbing a user's past contributions from an organization activity timeline when the user adds a contact identifier to a user-level blacklist in accordance with the disclosed embodiments.

FIG. 4A is a flow chart that illustrates an exemplary method 400 for retroactively scrubbing a user's past contributions from an organization activity timeline when the user adds a contact identifier to a user-level blacklist in accordance with the disclosed embodiments. As a preliminary matter, it should be understood that steps of the method 400 are not necessarily limiting, and that steps can be added, omitted, and/or performed simultaneously without departing from the scope of the appended claims. It should be appreciated that the method 400 may include any number of additional or alternative tasks, that the tasks shown in FIG. 4A need not be performed in the illustrated order, and that the method 400 may be incorporated into a more comprehensive procedure or process having additional functionality not described in detail herein. Moreover, one or more of the tasks shown in FIG. 4A could potentially be omitted from an embodiment of the method 400 as long as the intended overall functionality remains intact. It should also be understood that the illustrated method 400 can be stopped at any time. The method 400 is computer-implemented in that various tasks or steps that are performed in connection with the method 400 may be performed by software, hardware, firmware, or any combination thereof. For illustrative purposes, the following description of the method 400 may refer to elements mentioned above in connection with FIGS. 2 and 3A. In certain embodiments, some or all steps of this process, and/or substantially equivalent steps, are performed by execution of processor-readable instructions stored or included on a processor-readable medium.

At some point prior to the start of the method 400, the user adds one or more contact identifiers, such as email addresses, to a user-level blacklist. This is represented in FIG. 4A by block 410. For sake of simplicity the following description will focus on a single contact identifier for a single contact being added to the user-level blacklist, but it should be appreciated that the user could add any number of contact identifiers for any number of contacts to the user-level blacklist. The method 400 begins at 420, when the elasticsearch engine 210 performs a search to find all activities in the organization activity timeline that include a contact identifier from the user's of user-level blacklist. The organization activity timeline the particular contacts activities with all users of the organization, and includes any contributions by all users of the organization. Step 420 can be triggered, for example, each time a contact identifier is added the user's of user-level blacklist, at which point the system can search activities in the organization activity timeline that include that contact identifier.

At 430, the past activity scrubber 332 can then scrub (e.g., remove) the user's prior contributions to each activity that is associated with the contact identifier(s) so that any prior contributions by that user to those activities do not appear in the organization activity timeline to other users of the organization.

For example, when the past activity scrubber 332 determines that this user is the sole contributor within the organization to an activity, the past activity scrubber 332 can remove the entire activity so that it does not appear in the organization activity timeline to other users of the organization.

By contrast, when the past activity scrubber 332 determines that this user is not the sole contributor within the organization to an activity, then the past activity scrubber 332 can remove the user's contribution(s) to that activity so that any contributions by the user to the activity do not appear in the organization activity timeline to other users of the organization. However, contributions of other users of the organization to that activity are allowed to remain in the organization activity timeline unless the other users also have that contact identifier in their user-level blacklist, in which case the contributions of those users would also be removed from the activity timeline.

Figure 4B:
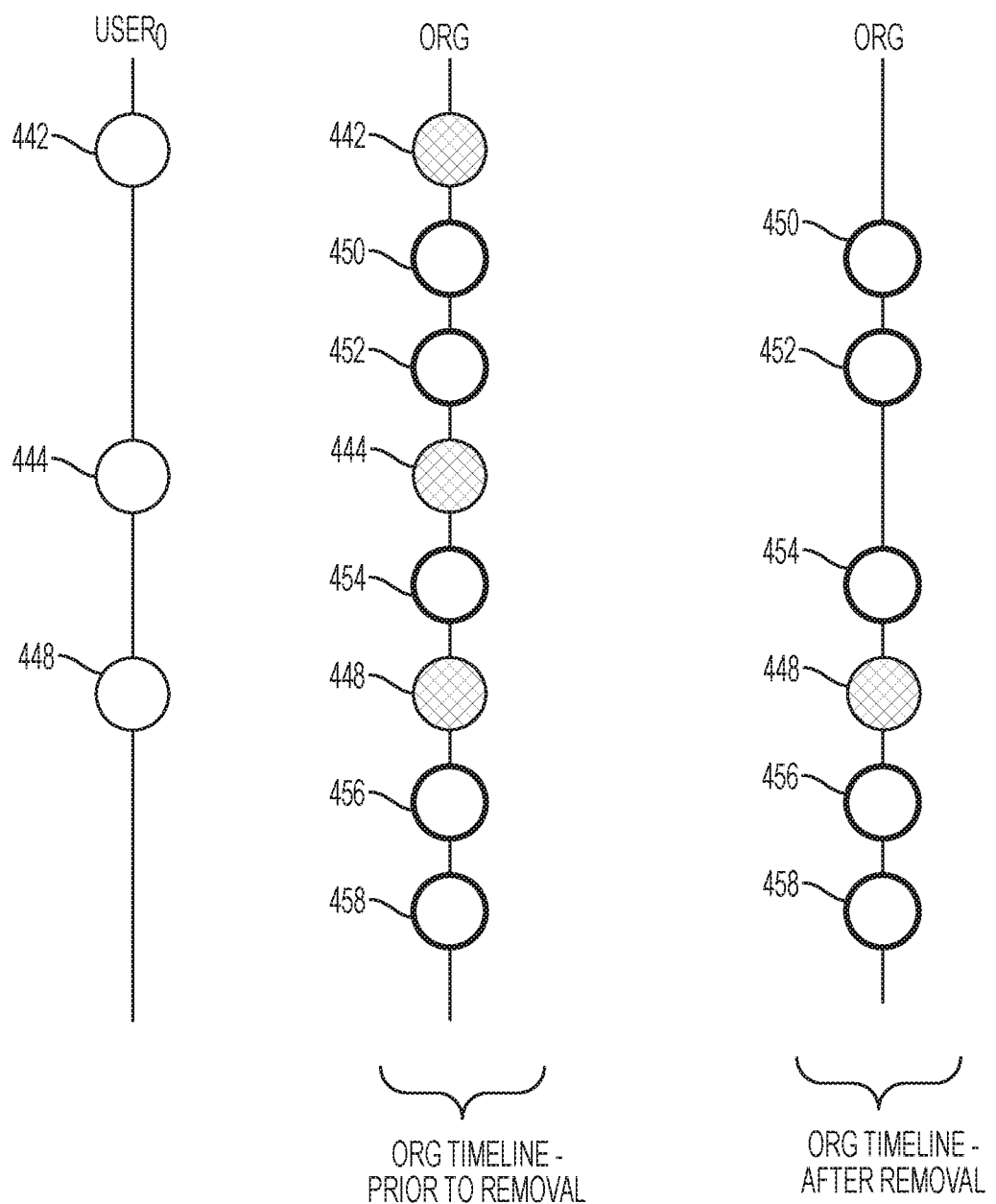
FIG. 4B is a schematic diagram of simplified representations of a contributor activity timeline and an organization activity timeline before and after retroactive scrubbing to remove some of the user's contributions in accordance with the disclosed embodiments.

FIG. 4B is a schematic diagram of simplified representations of a contributor activity timeline (User0) and an organization activity timeline before and after retroactive scrubbing to remove some of the user's contributions in accordance with the disclosed embodiments. Here, it assumed that a user (User0) of the organization has added a contact identifier to their user-level blacklist, and that User0 has contributed to activities 442, 444, 448 are associated with that contact identifier. With respect to activities 442, 444, User0 is the sole contributor within the organization to those activities (e.g., emails between User0 and the contact associated with the contact identifier), whereas there are other contributors within the organization to activity 448. As shown, prior to adding the contact identifier to User0's user-level blacklist, activities 442, 444, 448 all appear in the organization activity timeline. By contrast, after adding the contact identifier to User0's user-level blacklist, the past activity scrubber 332 can scrubs User0's prior contributions to each activity 442, 444, 448 that is associated with the contact identifier. Activities 442, 444 no longer appear in the organization activity timeline because User0 was the sole contributor within the organization to those activities, while activity 448 still appears in the organization activity timeline because User0 was not the sole contributor within the organization to activity 448. However, User0's contributions to activity 448 have been removed so that they do not appear in the organization activity timeline to other users of the organization. As such, User0's prior contributions to each activity that is associated with the contact identifier no longer appear in the organization activity timeline to other users of the organization. Contributions of other users of the organization to activity 448 remain in the organization activity timeline (unless the other users also have the contact identifier in their user-level blacklist, in which case the contributions of those users would also be removed from the activity timeline).

Figure 4D:
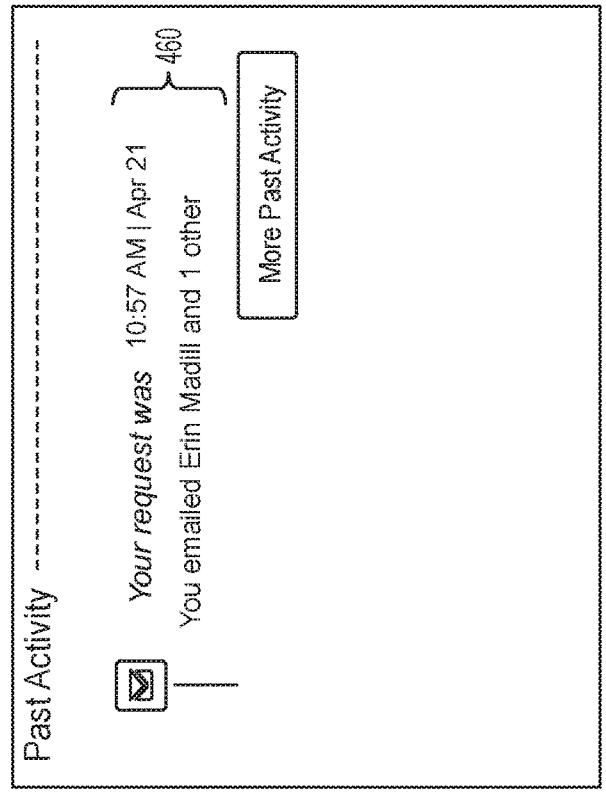
FIG. 4D is a screenshot of the organization activity timeline of FIG. 4C after retroactive scrubbing to remove some of the user's contributions in accordance with the disclosed embodiments.
Figure 4C:
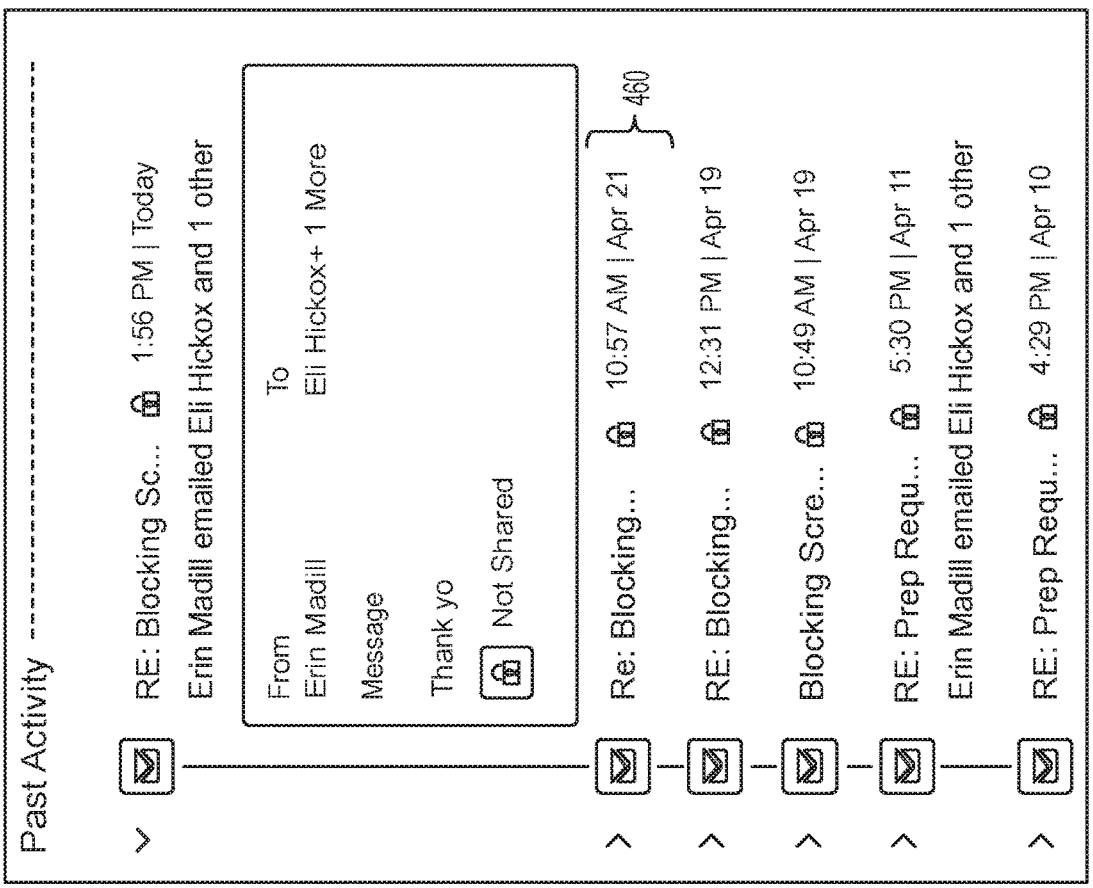
FIG. 4C is a screenshot of an organization activity timeline before retroactive scrubbing to remove some of the user's contributions in accordance with the disclosed embodiments.

FIG. 4C is a screenshot of an organization activity timeline before retroactive scrubbing to remove some of the user's contributions, and FIG. 4D is a screenshot of the organization activity timeline of FIG. 4C after retroactive scrubbing to remove some of the user's contributions. Here, it assumed that a user (Eli Hickox) of the organization has added a contact identifier for Erin Madill to his user-level blacklist, and that Eli Hickox has contributed to all of the past activities (emails in this example) shown in FIG. 4C that include at least Eli Hickox and Erin Madill. With respect to all of the activities except activity 460, Eli Hickox is the sole contributor within the organization to those activities (e.g., emails between Eli Hickox and Erin Madill), whereas there are other contributors within the organization to activity 460. As shown in FIG. 4C, prior to adding the contact identifier for Erin Madill to Eli Hickox's user-level blacklist, all of the activities appear in the organization activity timeline. By contrast, after adding the contact identifier for Erin Madill to Eli Hickox's user-level blacklist, the past activity scrubber 332 can scrub Eli Hickox's prior contributions to each activity that is associated with the contact identifier. As shown in FIG. 4D, all of the activities except activity 460 no longer appear in the organization activity timeline because Eli Hickox was the sole contributor within the organization to those activities, while activity 460 still appears in the organization activity timeline because Eli Hickox was not the sole contributor within the organization to activity 460. However, Eli Hickox's contributions to activity 460 have been removed so that they do not appear in the organization activity timeline to other users of the organization. As such, Eli Hickox's prior contributions to each activity that is associated with the contact identifier no longer appear in the organization activity timeline to other users of the organization. Contributions of other users of the organization to activity 460 remain in the organization activity timeline.

Figures 5, 6A:
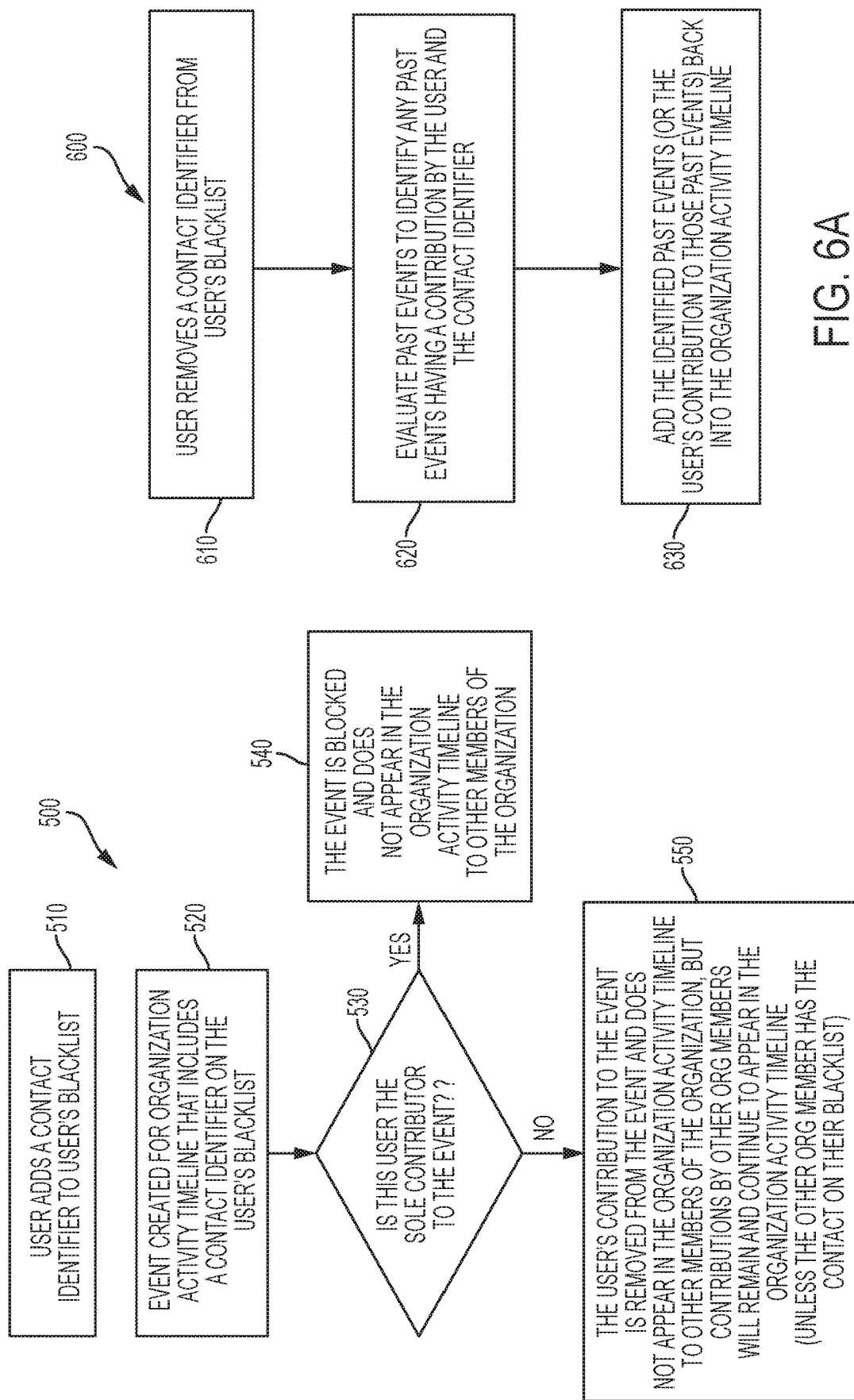
FIG. 5 is a flow chart that illustrates an exemplary method for real-time content blocking based on a user-level blacklist to prevent a user's contributions from appearing in new activities that are being evaluated for addition to an organization activity timeline in accordance with the disclosed embodiments.
FIG. 6A is a flow chart that illustrates an exemplary method for retro-reactively adding a user's past contributions back into an organization activity timeline when the user removes a contact identifier from a user-level blacklist in accordance with the disclosed embodiments.

FIG. 5 is a flow chart that illustrates an exemplary method 500 for real-time content blocking based on a user-level blacklist to prevent a user's contributions from appearing in new activities that are being evaluated for addition to an organization activity timeline in accordance with the disclosed embodiments. The method 500 can be used, for example, to selectively block a user's new contributions to an activity from appearing in the organization activity timeline after user adds a contact to a user-level blacklist. As a preliminary matter, it should be understood that steps of the method 500 are not necessarily limiting, and that steps can be added, omitted, and/or performed simultaneously without departing from the scope of the appended claims. It should be appreciated that the method 500 may include any number of additional or alternative tasks, that the tasks shown in FIG. 5 need not be performed in the illustrated order, and that the method 500 may be incorporated into a more comprehensive procedure or process having additional functionality not described in detail herein. Moreover, one or more of the tasks shown in FIG. 5 could potentially be omitted from an embodiment of the method 500 as long as the intended overall functionality remains intact. It should also be understood that the illustrated method 500 can be stopped at any time. The method 500 is computer-implemented in that various tasks or steps that are performed in connection with the method 500 may be performed by software, hardware, firmware, or any combination thereof. For illustrative purposes, the following description of the method 500 may refer to elements mentioned above in connection with FIGS. 2 and 3A. In certain embodiments, some or all steps of this process, and/or substantially equivalent steps, are performed by execution of processor-readable instructions stored or included on a processor-readable medium.

At some point prior to the start of the method 500, the user adds one or more contact identifiers, such as email addresses, to a user-level blacklist. This is represented in FIG. 5 by block 510. The method 500 begins at 520, when an activity is created for the organization activity timeline that includes a contact identifier on the user's of user-level blacklist. The user who added the contact identifier to the blacklist or any other user who is part of the organization can create the activity. At 530, the real-time activity evaluator 330 determines whether this user is the sole contributor within the organization to the activity (e.g., determines whether the user and the particular contact are the only participants for the activity, or if there are other contributors to the activity who are also participants).

When the real-time activity evaluator 330 determines (at 530) that this user is the sole contributor (within the organization) to the activity, at 540, the real-time activity evaluator 330 blocks the activity so that the activity does not appear in the organization activity timeline to other users of the organization. By contrast, when the real-time activity evaluator 330 determines (at 530) that this user is not the sole contributor within the organization to the activity, at 550, the real-time activity evaluator 330 blocks the user's contribution to the activity so that any contributions by the user to the activity do not appear in the organization activity timeline to other users of the organization so long as the contact identifier remains in that user's user-level blacklist. However, contributions of other users of the organization to that activity are allowed to remain and continue to appear in the organization activity timeline unless the other users also have that contact identifier in their user-level blacklist, in which case the contributions of those users would also be blocked or removed from the organization activity timeline.

FIG. 6A is a flow chart that illustrates an exemplary method 600 for retro-reactively adding a user's past contributions back into an organization activity timeline when a user removes a contact identifier from a user-level blacklist in accordance with the disclosed embodiments. The method 600 allows a user to effectively reverse the scrub operations and add their contributions back into the activity timeline when the user removes a contact identifier associated with a particular contact from the user-level blacklist. As a preliminary matter, it should be understood that steps of the method 600 are not necessarily limiting, and that steps can be added, omitted, and/or performed simultaneously without departing from the scope of the appended claims. It should be appreciated that the method 600 may include any number of additional or alternative tasks, that the tasks shown in FIG. 6A need not be performed in the illustrated order, and that the method 600 may be incorporated into a more comprehensive procedure or process having additional functionality not described in detail herein. Moreover, one or more of the tasks shown in FIG. 6A could potentially be omitted from an embodiment of the method 600 as long as the intended overall functionality remains intact. It should also be understood that the illustrated method 600 can be stopped at any time. The method 600 is computer-implemented in that various tasks or steps that are performed in connection with the method 600 may be performed by software, hardware, firmware, or any combination thereof. For illustrative purposes, the following description of the method 600 may refer to elements mentioned above in connection with FIGS. 2 and 3A. In certain embodiments, some or all steps of this process, and/or substantially equivalent steps, are performed by execution of processor-readable instructions stored or included on a processor-readable medium.

Method 600 begins at 610, when a user of the organization removes a contact identifier associated with a particular contact from the user-level blacklist (e.g., deletes an email address from their user-level blacklist). In response to removing, at 620, the past activity scrubber 332 evaluates past activities to identify past activities that were previously in the organization activity timeline that include past contributions by the user and the contact identifier associated with the particular contact. At 630, the past activity scrubber 332 adds the past activities back into the organization activity timeline so that past contributions by the user appear in the organization activity timeline. As such, an activities that the user was the sole contributor to will also appear in the organization activity timeline. In addition, although not illustrated in FIG. 6A, it should be appreciated that any new activities that include new contributions by the user and the contact identifier will now appear in the organization activity timeline (e.g., blocking will now longer take place with respect to any new activities that include new contributions by the user and the contact identifier).

Figure 6B:
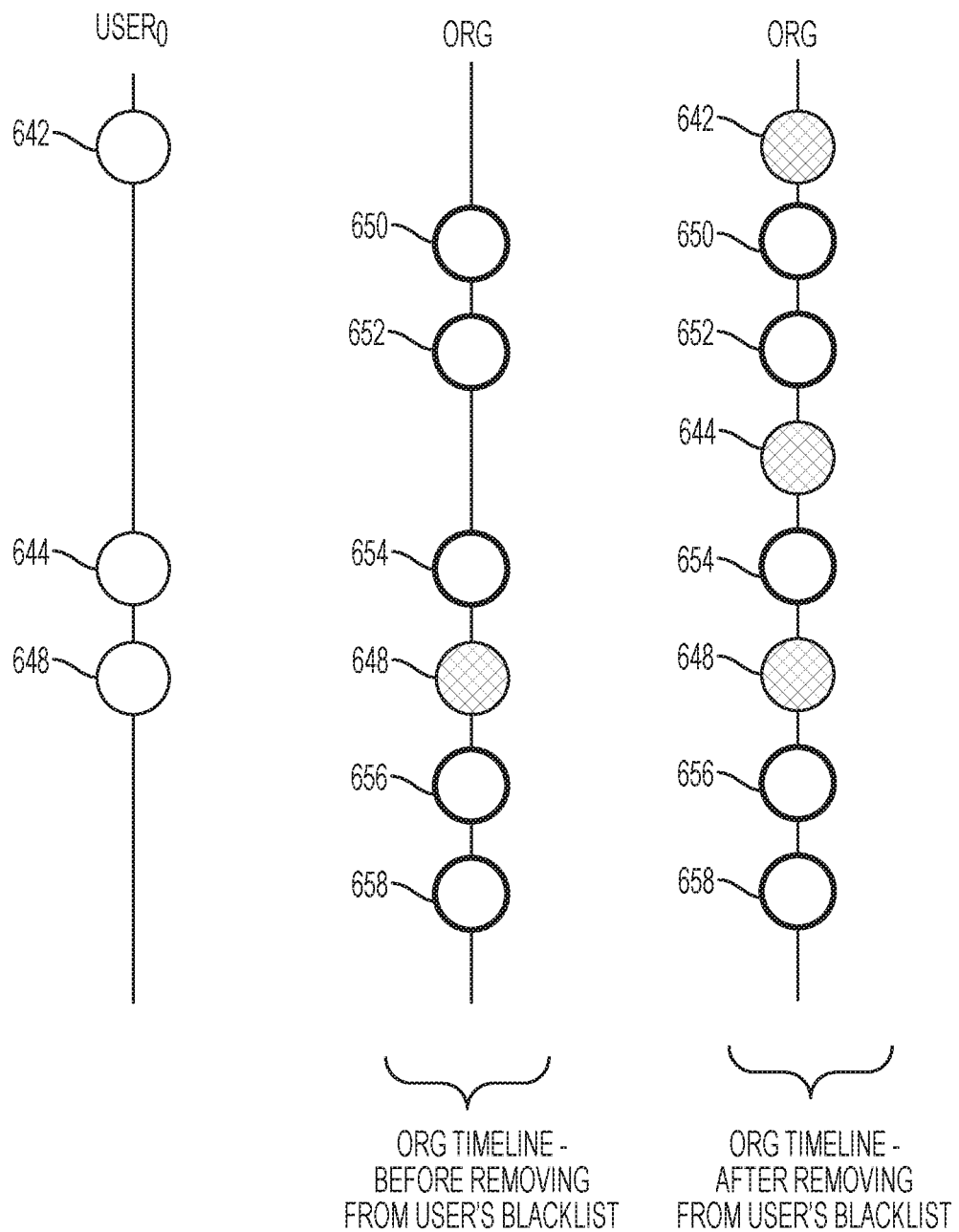
FIG. 6B is a schematic diagram of simplified representations of a contributor activity timeline and an organization activity timeline before and after retro-reactively adding some of the user's past contributions back into the organization activity timeline in accordance with the disclosed embodiments.

FIG. 6B is a schematic diagram of simplified representations of a contributor activity timeline and an organization activity timeline before and after retro-reactively adding some of the user's past contributions back into the organization activity timeline in accordance with the disclosed embodiments. FIG. 6B shows the opposite scenario illustrated in FIG. 4B.

Here, it assumed that a user (User0) of the organization had previously added a contact identifier to their user-level blacklist, and that User0 has contributed to activities 642, 644, 648 are associated with that contact identifier. As shown, prior to removing the contact identifier to User0's user-level blacklist, activities 642, 644 do not appear in the organization activity timeline, and with respect to activity 648, User0's contributions to activity 648 have been removed so that they do not appear in the organization activity timeline to other users of the organization. By contrast, after removing the contact identifier from User0's user-level blacklist, the past activity scrubber 332 adds User0's prior contributions to each activity 642, 644, 648 that is associated with the contact identifier back into the organization activity timeline. Activities 642, 644 now appear in the organization activity timeline because User0 was the sole contributor within the organization to those activities, while User0's contributions to activity 648 have been added back into that activity so that they now appear in the organization activity timeline to other users of the organization. As such, User0's prior contributions to each activity that is associated with the contact identifier now appear in the organization activity timeline to other users of the organization (unless the other users also have the contact identifier in their user-level blacklist, in which case the contributions of those users would also be removed from the activity timeline).

Figure 7A:
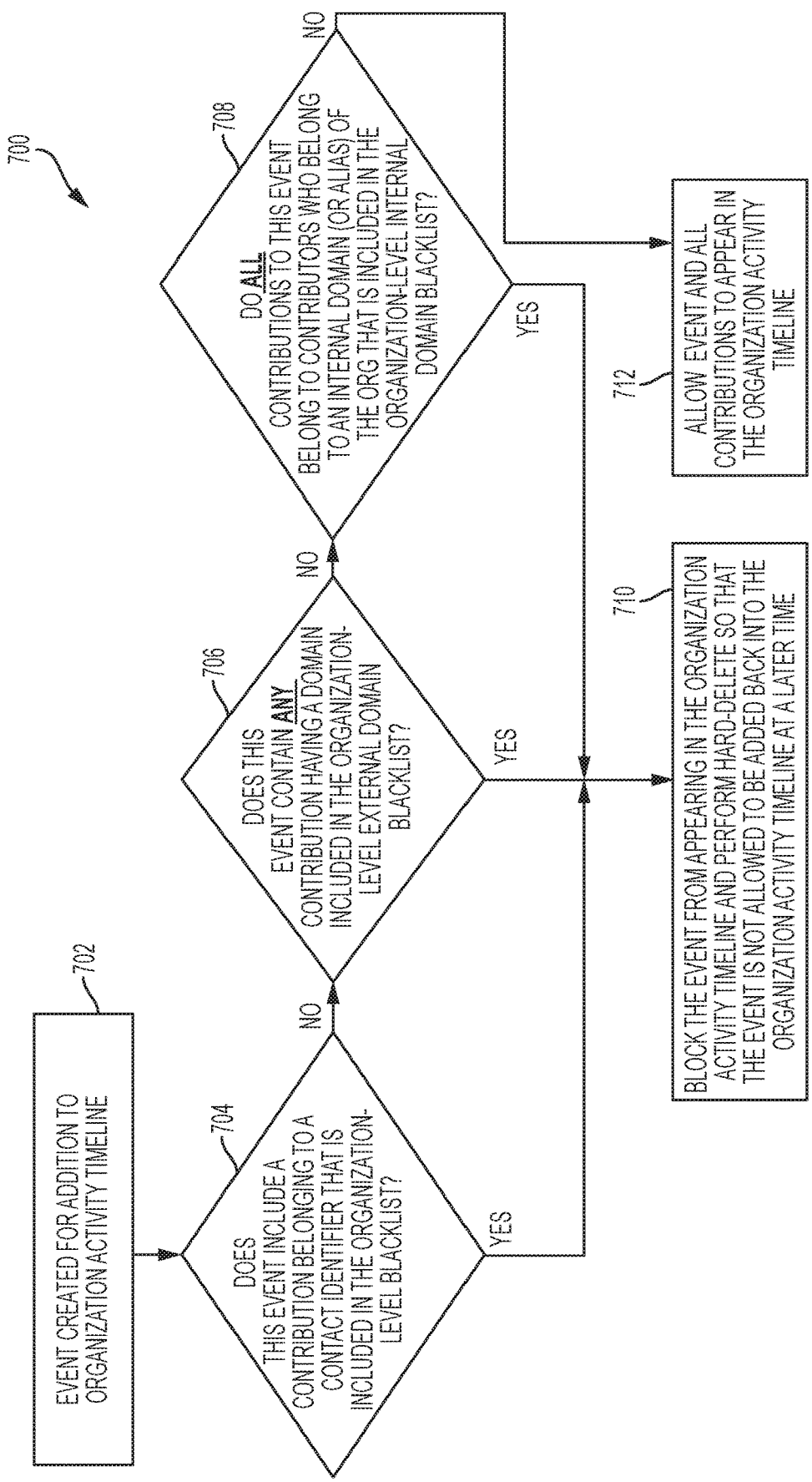
FIG. 7A is a flow chart that illustrates an exemplary real-time activity evaluation method for determining whether new activities are allowed to appear in an organization activity timeline based on various organization-level blacklists in accordance with the disclosed embodiments.

FIG. 7A is a flow chart that illustrates an exemplary real-time activity evaluation method 700 for determining whether new activities are allowed to appear in an organization activity timeline based on checking of various organization-level blacklists in accordance with the disclosed embodiments. As a preliminary matter, it should be understood that steps of the method 700 are not necessarily limiting, and that steps can be added, omitted, and/or performed simultaneously without departing from the scope of the appended claims. It should be appreciated that the method 700 may include any number of additional or alternative tasks, that the tasks shown in FIG. 7A need not be performed in the illustrated order, and that the method 700 may be incorporated into a more comprehensive procedure or process having additional functionality not described in detail herein. Moreover, one or more of the tasks shown in FIG. 7A could potentially be omitted from an embodiment of the method 700 as long as the intended overall functionality remains intact. It should also be understood that the illustrated method 700 can be stopped at any time. The method 700 is computer-implemented in that various tasks or steps that are performed in connection with the method 700 may be performed by software, hardware, firmware, or any combination thereof. For illustrative purposes, the following description of the method 700 may refer to elements mentioned above in connection with FIGS. 2 and 3A. In certain embodiments, some or all steps of this process, and/or substantially equivalent steps, are performed by execution of processor-readable instructions stored or included on a processor-readable medium.

The method 700 begins at 702, when an activity is created and evaluated for inclusion in the organization activity timeline. The activity can be evaluated against organization-level blacklists for specific contacts specified by the administrator, organization-level external domain blacklists for specific external domains specified by the administrator, and organization-level internal domain blacklists for specific internal domains specified by the administrator.

At 704, the real-time activity evaluator 330 can evaluate the activity against the organization-level blacklist to determine whether the activity includes a contribution from any contact identifiers included in the organization-level blacklist. The administrator of the organization can include any number of contact identifiers each of which is associated with a particular contact. When the real-time activity evaluator 330 determines (at 704) that the activity does not include a contribution from any contact identifiers included in the organization-level blacklist, the method proceeds to 706. When the real-time activity evaluator 330 determines (at 704) that the activity does include a contribution from one or more contact identifiers included in the organization-level blacklist, the method proceeds to 710.

At 706, the real-time activity evaluator 330 can evaluate the activity against the organization-level external domain blacklist, and determine whether the activity includes any contribution having an external domain specified in the organization-level external domain blacklist. The administrator of the organization can include any number of external domains in the organization-level external domain blacklist each of which is associated with a particular external domain that is external to the organization. When the real-time activity evaluator 330 determines (at 706) that the activity does not include any contribution having an external domain specified in the organization-level external domain blacklist, the method proceeds to 708. When the real-time activity evaluator 330 determines (at 706) that the activity does include any contribution having an external domain specified in the organization-level external domain blacklist, the method proceeds to 710.

At 708, the real-time activity evaluator 330 can evaluate the activity against the organization-level internal domain blacklist, and determine whether all contributions to the activity have the internal domain specified in the organization-level internal domain blacklist. The administrator of the organization can include the internal domain of the organization and any number of aliases of that internal domain in the organization-level internal domain blacklist. As such, at 708, the real-time activity evaluator 330 can evaluate the activity against the organization-level internal domain blacklist, and determine whether all contributions to the activity belong to an internal domain or alias of the internal domain of the organization as specified in the organization-level internal domain blacklist.

When the real-time activity evaluator 330 determines (at 708) that all contributions to the activity belong to an internal domain or alias, the method proceeds to 710. At 710, the real-time activity evaluator 330 performs a hard-delete and blocks the activity from appearing in the organization activity timeline. Because the activity is hard-deleted the activity is not allowed to be retroactively added back into the organization activity timeline at a later time.

When the real-time activity evaluator 330 determines (at 708) that all contributions to the activity do not belong to an internal domain or alias, the method proceeds to 712, where the real-time activity evaluator 330 allows the activity and all contributions to the activity to appear in the organization activity timeline.

Whenever the organization-level blacklist, the organization-level external domain blacklist, or the organization-level internal domain blacklist are updated by the administrator, the past activity scrubber 332 can retroactively perform scrubbing to remove past activities from the organization activity timeline. As will now be described with reference to FIGS. 7B-7D, the past activity scrubber 332 can search the organization activity timeline to find past activities that are to be deleted from the organization activity timeline, and then hard-delete such identified past activities from the organization activity timeline so that the identified past activities no longer appear in the organization activity timeline and are not allowed to be added back into the organization activity timeline at a later time.

Figure 7B:
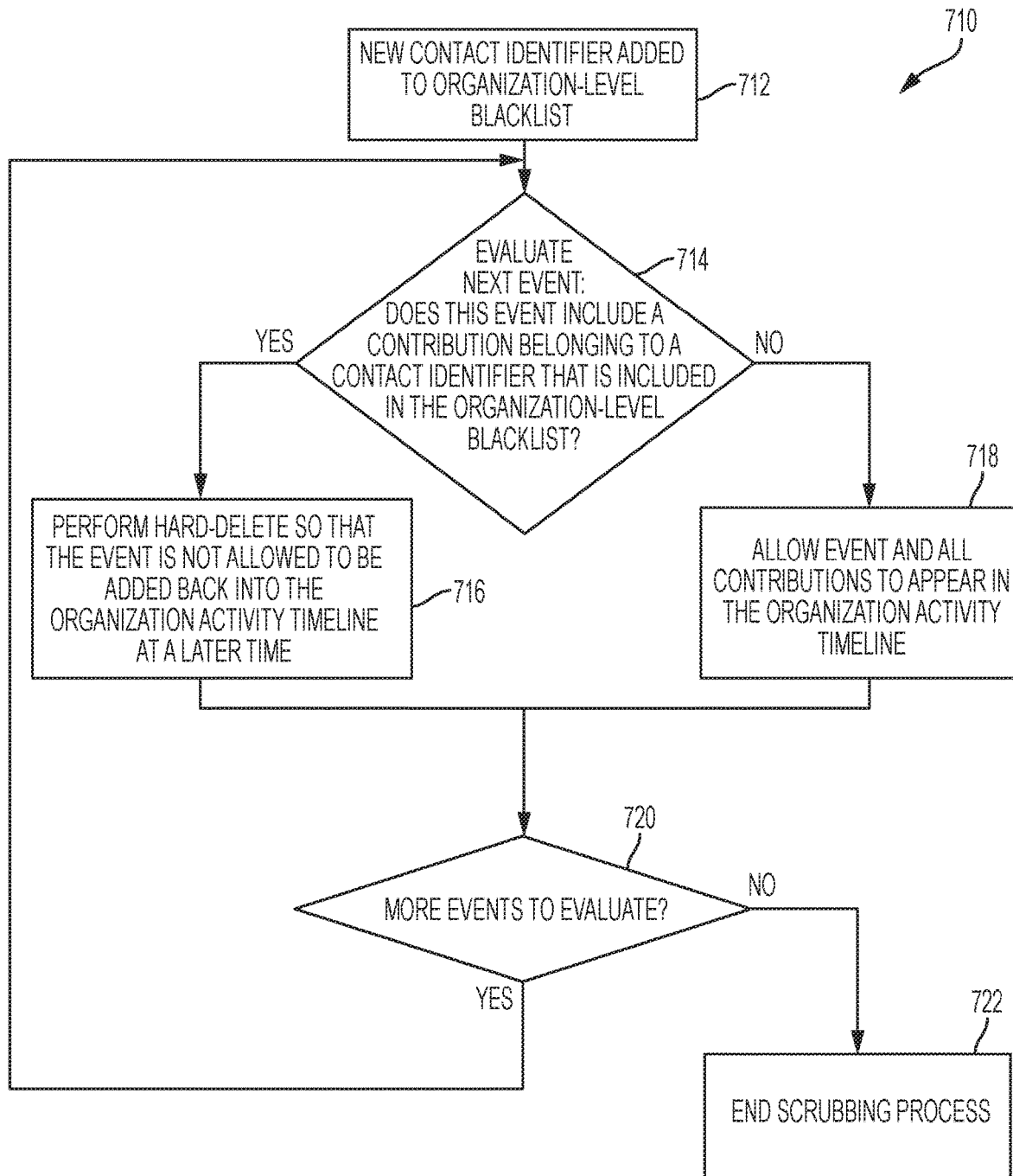
FIG. 7B is a flow chart that illustrates an exemplary method for retroactively scrubbing a past activities from an organization activity timeline when the administrator adds a contact identifier to an organization-level blacklist in accordance with the disclosed embodiments.

FIG. 7B is a flow chart that illustrates an exemplary method 710 for retroactively scrubbing a past activities from an organization activity timeline when the administrator adds a contact identifier to an organization-level blacklist in accordance with the disclosed embodiments. As a preliminary matter, it should be understood that steps of the method 710 are not necessarily limiting, and that steps can be added, omitted, and/or performed simultaneously without departing from the scope of the appended claims. It should be appreciated that the method 710 may include any number of additional or alternative tasks, that the tasks shown in FIG. 7B need not be performed in the illustrated order, and that the method 710 may be incorporated into a more comprehensive procedure or process having additional functionality not described in detail herein. Moreover, one or more of the tasks shown in FIG. 7B could potentially be omitted from an embodiment of the method 710 as long as the intended overall functionality remains intact. It should also be understood that the illustrated method 710 can be stopped at any time. The method 710 is computer-implemented in that various tasks or steps that are performed in connection with the method 710 may be performed by software, hardware, firmware, or any combination thereof. For illustrative purposes, the following description of the method 710 may refer to elements mentioned above in connection with FIGS. 2 and 3A. In certain embodiments, some or all steps of this process, and/or substantially equivalent steps, are performed by execution of processor-readable instructions stored or included on a processor-readable medium.

The method 710 begins at 712, when a new contact identifier for a specific contact is added to an organization-level blacklist by the administrator. This triggers evaluation of past activities against the organization-level blacklist so that activities can be removed or "scrubbed from" the organization activity timeline.

At 714, the past activity scrubber 332 can evaluate the next activity in the organization activity timeline against the organization-level blacklist to determine whether the activity includes a contribution from the new contact identifier that was added to the organization-level blacklist.

When the past activity scrubber 332 determines (at 714) that the activity does include a contribution from the new contact identifier that was added to the organization-level blacklist, the method proceeds to 716, where the past activity scrubber 332 performs a hard-delete and removes the activity from the organization activity timeline so that the activity no longer appears in the organization activity timeline. Because the activity is hard-deleted the activity is not allowed to be retroactively added back into the organization activity timeline at a later time.

When the past activity scrubber 332 determines (at 714) that the activity does not include a contribution from the new contact identifier that was added to the organization-level blacklist, the method proceeds to 718, where the past activity scrubber 332 allows the activity and all contributions to the activity to continue to appear in the organization activity timeline.

Following 716 and 718, the past activity scrubber 332 determines (at 720) whether anymore activities remain in the organization activity timeline to be evaluated (e.g., that have not been evaluated or changed since prior evaluation). When the past activity scrubber 332 determines (at 720) that more activities remain in the organization activity timeline to evaluate, the method 710 loops back to 714. By contrast, when the past activity scrubber 332 determines (at 720) that no more activities remain in the organization activity timeline to be evaluated, the method 710 ends at 722 until it is triggered again.

Figure 7C:
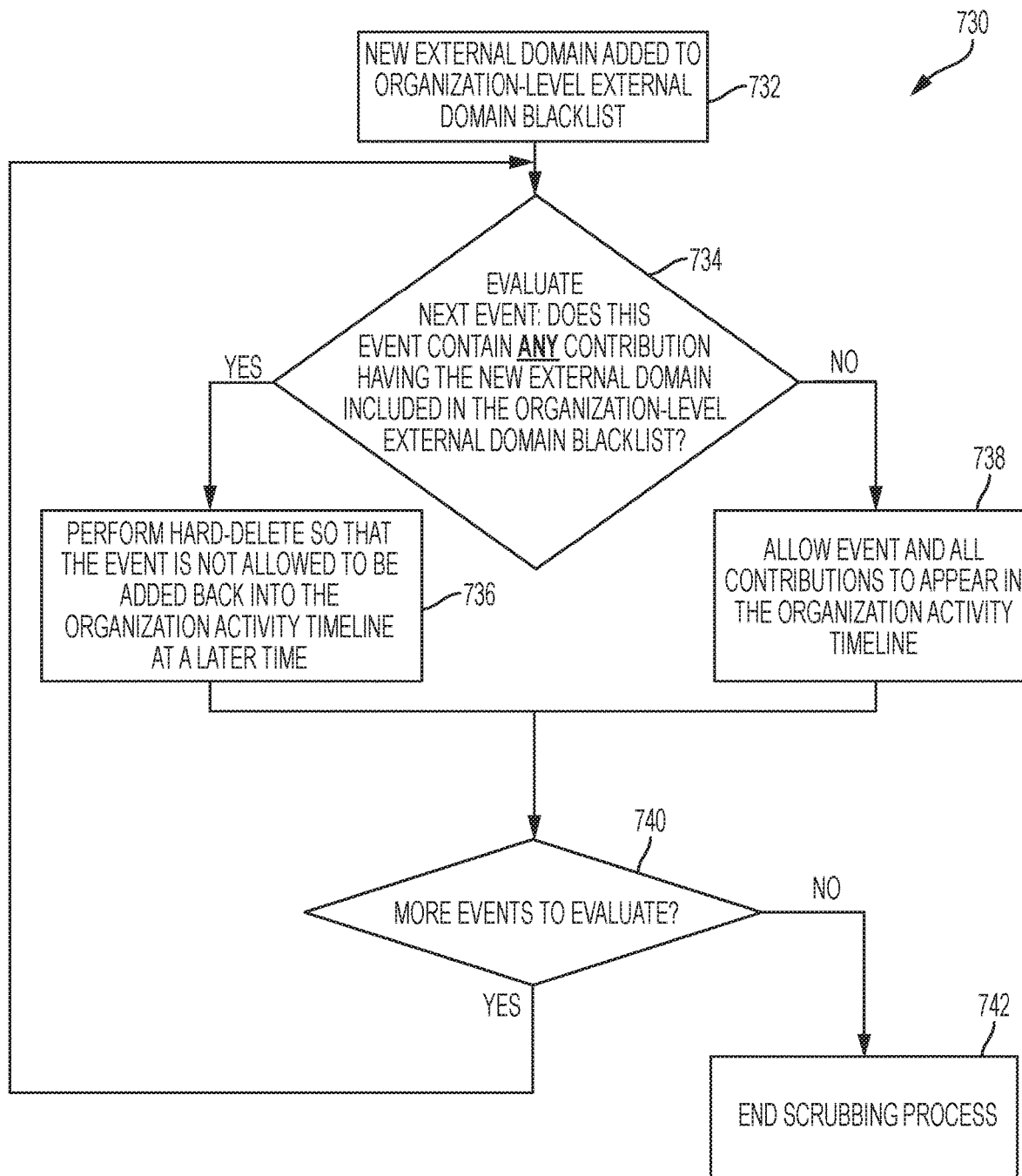
FIG. 7C is a flow chart that illustrates an exemplary method for retroactively scrubbing a past activities from an organization activity timeline when the administrator adds an external domain to an organization-level external domain blacklist in accordance with the disclosed embodiments.

FIG. 7C is a flow chart that illustrates an exemplary method 730 for retroactively scrubbing a past activities from an organization activity timeline when the administrator adds an external domain to an organization-level external domain blacklist in accordance with the disclosed embodiments. As a preliminary matter, it should be understood that steps of the method 730 are not necessarily limiting, and that steps can be added, omitted, and/or performed simultaneously without departing from the scope of the appended claims. It should be appreciated that the method 730 may include any number of additional or alternative tasks, that the tasks shown in FIG. 7C need not be performed in the illustrated order, and that the method 730 may be incorporated into a more comprehensive procedure or process having additional functionality not described in detail herein. Moreover, one or more of the tasks shown in FIG. 7C could potentially be omitted from an embodiment of the method 730 as long as the intended overall functionality remains intact. It should also be understood that the illustrated method 730 can be stopped at any time. The method 730 is computer-implemented in that various tasks or steps that are performed in connection with the method 730 may be performed by software, hardware, firmware, or any combination thereof. For illustrative purposes, the following description of the method 730 may refer to elements mentioned above in connection with FIGS. 2 and 3A. In certain embodiments, some or all steps of this process, and/or substantially equivalent steps, are performed by execution of processor-readable instructions stored or included on a processor-readable medium.

The method 730 begins at 732, when a new external domain is added to an organization-level external domain blacklist by the administrator. This triggers evaluation of past activities against the organization-level external domain blacklist so that activities can be removed or "scrubbed from" the organization activity timeline.

At 734, the past activity scrubber 332 can evaluate the next activity in the organization activity timeline against the organization-level external domain blacklist to determine whether the activity includes any contribution from or having the new external domain that was added to the organization-level external domain blacklist.

When the past activity scrubber 332 determines (at 734) that the activity does include any contribution from or having the new external domain that was added to the organization-level external domain blacklist, the method proceeds to 736, where the past activity scrubber 332 performs a hard-delete and removes the activity from the organization activity timeline so that the activity no longer appears in the organization activity timeline. Because the activity is hard-deleted the activity is not allowed to be retroactively added back into the organization activity timeline at a later time.

When the past activity scrubber 332 determines (at 734) that the activity does not include any contribution from or having the new external domain that was added to the organization-level external domain blacklist, the method proceeds to 738, where the past activity scrubber 332 allows the activity and all contributions to the activity to continue to appear in the organization activity timeline.

Following 736 and 738, the past activity scrubber 332 determines (at 740) whether anymore activities remain in the organization activity timeline to be evaluated (e.g., that have not been evaluated or changed since prior evaluation). When the past activity scrubber 332 determines (at 740) that more activities remain in the organization activity timeline to evaluate, the method 730 loops back to 734. By contrast, when the past activity scrubber 332 determines (at 740) that no more activities remain in the organization activity timeline to be evaluated, the method 730 ends at 722 until it is triggered again.

Thus, if the past activity scrubber 332 searches the organization activity timeline and finds one or more past activities that include any contribution having an external domain included in the organization-level external domain blacklist, then the past activity scrubber 332 can remove the identified past activities (that include an external domain included in the organization-level external domain blacklist) from the organization activity timeline by performing a hard-delete so that they no longer appear in the organization activity timeline and are not allowed to be added back into the organization activity timeline at a later time.

Figure 7D:
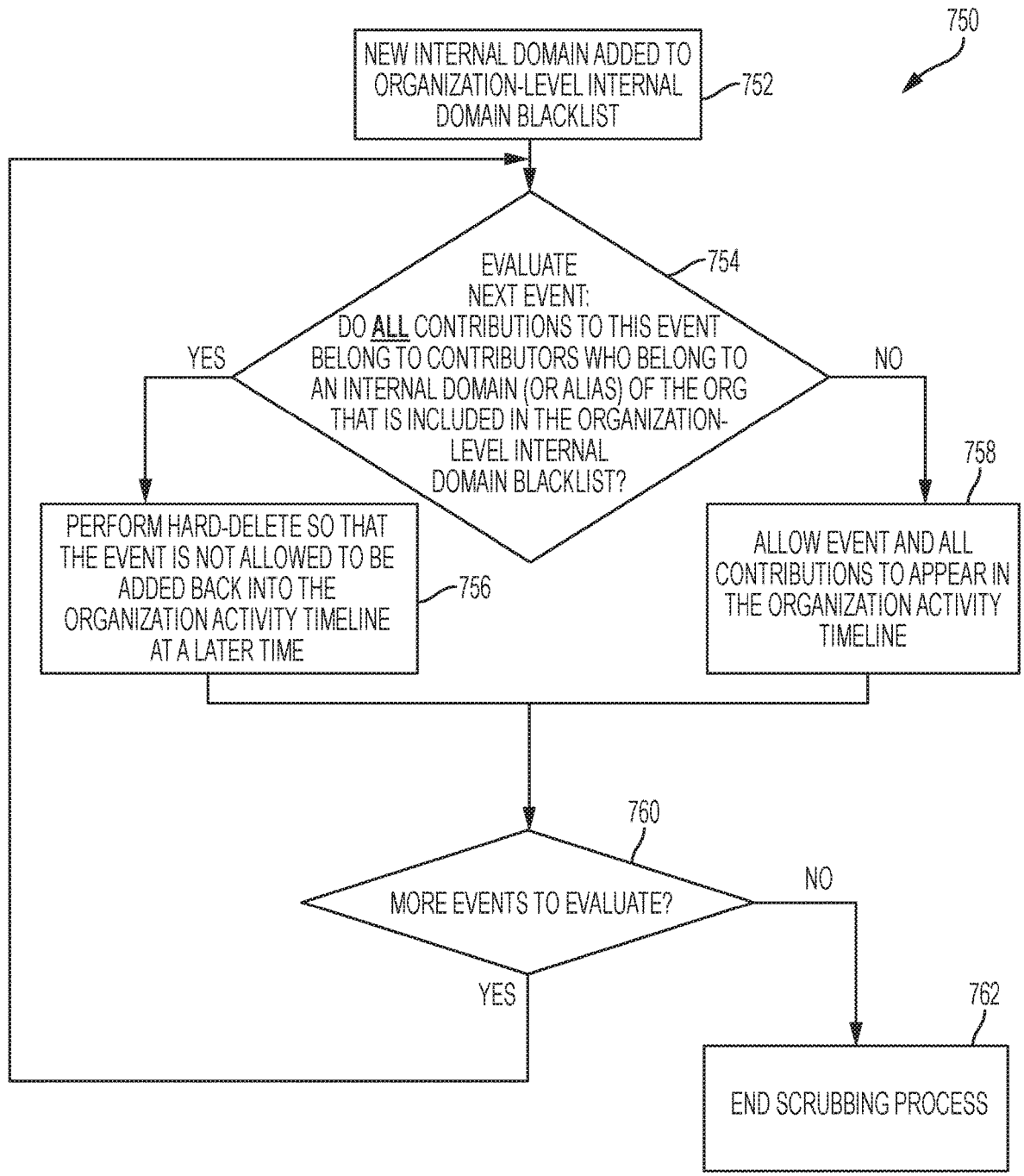
FIG. 7D is a flow chart that illustrates an exemplary method for retroactively scrubbing a past activities from an organization activity timeline when the administrator adds an internal domain to an organization-level internal domain blacklist in accordance with the disclosed embodiments.

FIG. 7D is a flow chart that illustrates an exemplary method 750 for retroactively scrubbing a past activities from an organization activity timeline when the administrator adds an internal domain to an organization-level internal domain blacklist in accordance with the disclosed embodiments. As a preliminary matter, it should be understood that steps of the method 750 are not necessarily limiting, and that steps can be added, omitted, and/or performed simultaneously without departing from the scope of the appended claims. It should be appreciated that the method 750 may include any number of additional or alternative tasks, that the tasks shown in FIG. 7D need not be performed in the illustrated order, and that the method 750 may be incorporated into a more comprehensive procedure or process having additional functionality not described in detail herein. Moreover, one or more of the tasks shown in FIG. 7D could potentially be omitted from an embodiment of the method 750 as long as the intended overall functionality remains intact. It should also be understood that the illustrated method 750 can be stopped at any time. The method 750 is computer-implemented in that various tasks or steps that are performed in connection with the method 750 may be performed by software, hardware, firmware, or any combination thereof. For illustrative purposes, the following description of the method 750 may refer to elements mentioned above in connection with FIGS. 2 and 3A. In certain embodiments, some or all steps of this process, and/or substantially equivalent steps, are performed by execution of processor-readable instructions stored or included on a processor-readable medium.

The method 750 begins at 752, when a new internal domain is added to an organization-level internal domain blacklist by the administrator. This triggers evaluation of past activities against the organization-level internal domain blacklist so that activities can be removed or "scrubbed from" the organization activity timeline.

At 754, the past activity scrubber 332 can evaluate the next activity in the organization activity timeline against the organization-level internal domain blacklist to determine whether all contributions to this activity have an internal domain of the organization specified in the organization-level internal domain blacklist including the new internal domain that was added to the organization-level internal domain blacklist. As noted above, the administrator of the organization can include the internal domain of the organization and any number of aliases of that internal domain in the organization-level internal domain blacklist. As such, at 754, the past activity scrubber 332 can evaluate the activity against the organization-level internal domain blacklist, and determine whether all contributions to the activity belong to an internal domain or alias of the internal domain of the organization as specified in the organization-level internal domain blacklist.

When the past activity scrubber 332 determines (at 754) that all contributions to this activity have an internal domain of the organization (as specified in the organization-level internal domain blacklist), the method proceeds to 756, where the past activity scrubber 332 performs a hard-delete and removes the activity from the organization activity timeline so that the activity no longer appears in the organization activity timeline. Because the activity is hard-deleted the activity is not allowed to be retroactively added back into the organization activity timeline at a later time.

When the past activity scrubber 332 determines (at 754) that that all contributions to this activity do not have an internal domain of the organization (as specified in the organization-level internal domain blacklist), the method proceeds to 758, where the past activity scrubber 332 allows the activity and all contributions to the activity to continue to appear in the organization activity timeline.

Following 756 and 758, the past activity scrubber 332 determines (at 760) whether anymore activities remain in the organization activity timeline to be evaluated (e.g., that have not been evaluated or changed since prior evaluation). When the past activity scrubber 332 determines (at 760) that more activities remain in the organization activity timeline to evaluate, the method 750 loops back to 754. By contrast, when the past activity scrubber 332 determines (at 760) that no more activities remain in the organization activity timeline to be evaluated, the method 750 ends at 762 until it is triggered again.

Thus, if the past activity scrubber 332 searches the organization activity timeline and finds one or more past activities where all contributions are from one or more internal domains included in the organization-level internal domain blacklist, then the past activity scrubber 332 can remove those identified past activities from the organization activity timeline by performing a hard-delete so that they no longer appear in the organization activity timeline and are not allowed to be added back into the organization activity timeline at a later time.

Figure 7E:
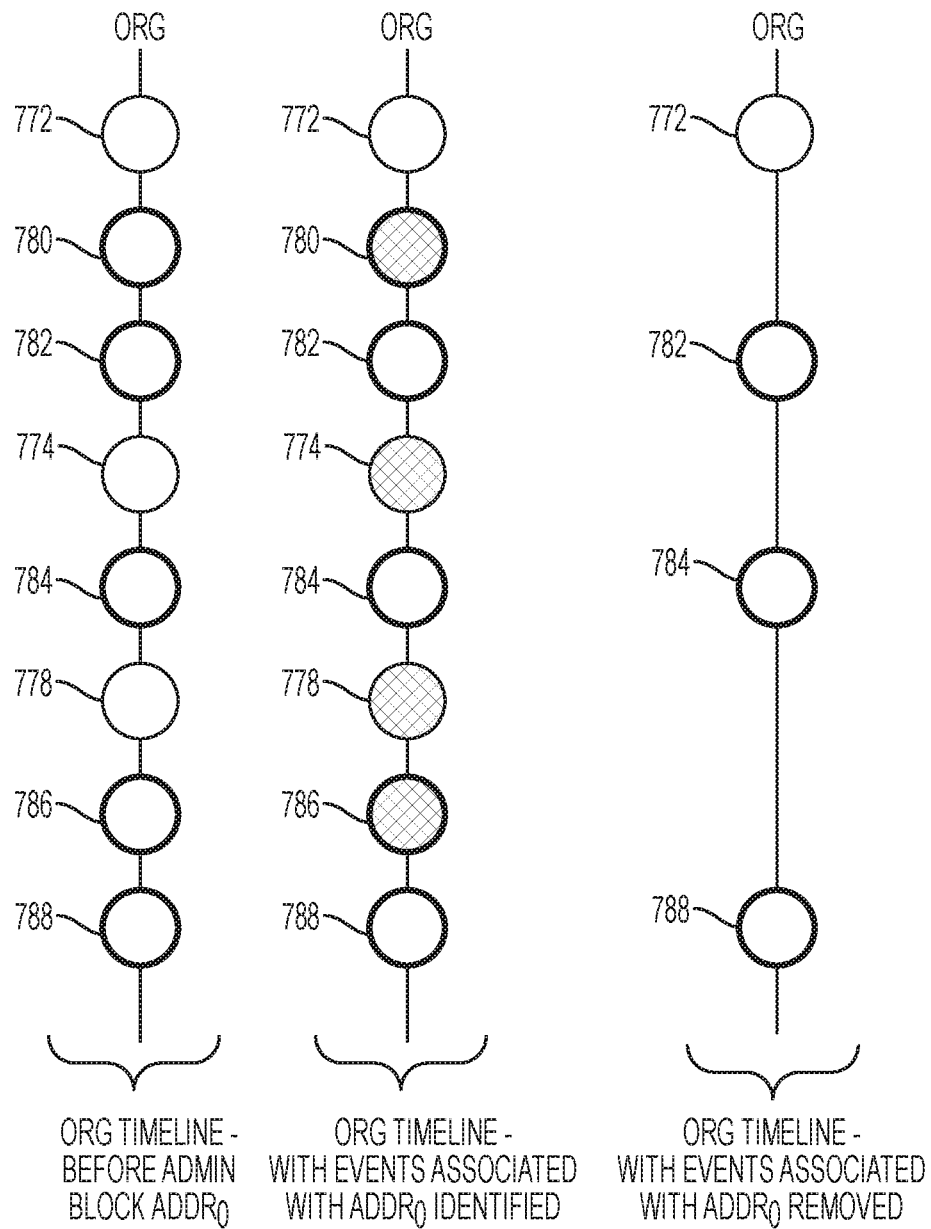
FIG. 7E is a schematic diagram of simplified representations of an organization activity timeline before an administrator adds a contact identifier ($Addr_0$) to an organization-level blacklist and the organization activity timeline after the administrator adds the contact identifier ($Addr_0$) to an organization-level blacklist in accordance with the disclosed embodiments.

FIG. 7E is a schematic diagram of simplified representations of an organization activity timeline before an administrator adds a contact identifier (Addr$_0$) to an organization-level blacklist and the organization activity timeline after the administrator adds the contact identifier (Addr$_0$) to an organization-level blacklist in accordance with the disclosed embodiments.

Before the administrator adds a contact identifier (Addr$_0$) to the organization-level blacklist, organization activity timeline included activities 772, 774, 778, 780, 782, 784, 786, 788. When the administrator adds a contact identifier (Addr0) to the organization-level blacklist, this triggers evaluation of past activities 772, 774, 778, 780, 782, 784, 786, 788 against the organization-level blacklist by the past activity scrubber 332. In this example, the past activity scrubber 332 evaluates each of the activities in the organization activity timeline against the organization-level blacklist and determines that activities 774, 778, 780, 786 include a contribution from the new contact identifier (Addr$_0$) that was added to the organization-level blacklist, and performs a hard-delete to remove activities 774, 778, 780, 786 from the organization activity timeline so that they no longer appears in the organization activity timeline. Because the activities 774, 778, 780, 786 are hard-deleted they are not allowed to be retroactively added back into the organization activity timeline at a later time.

Figure 7G:
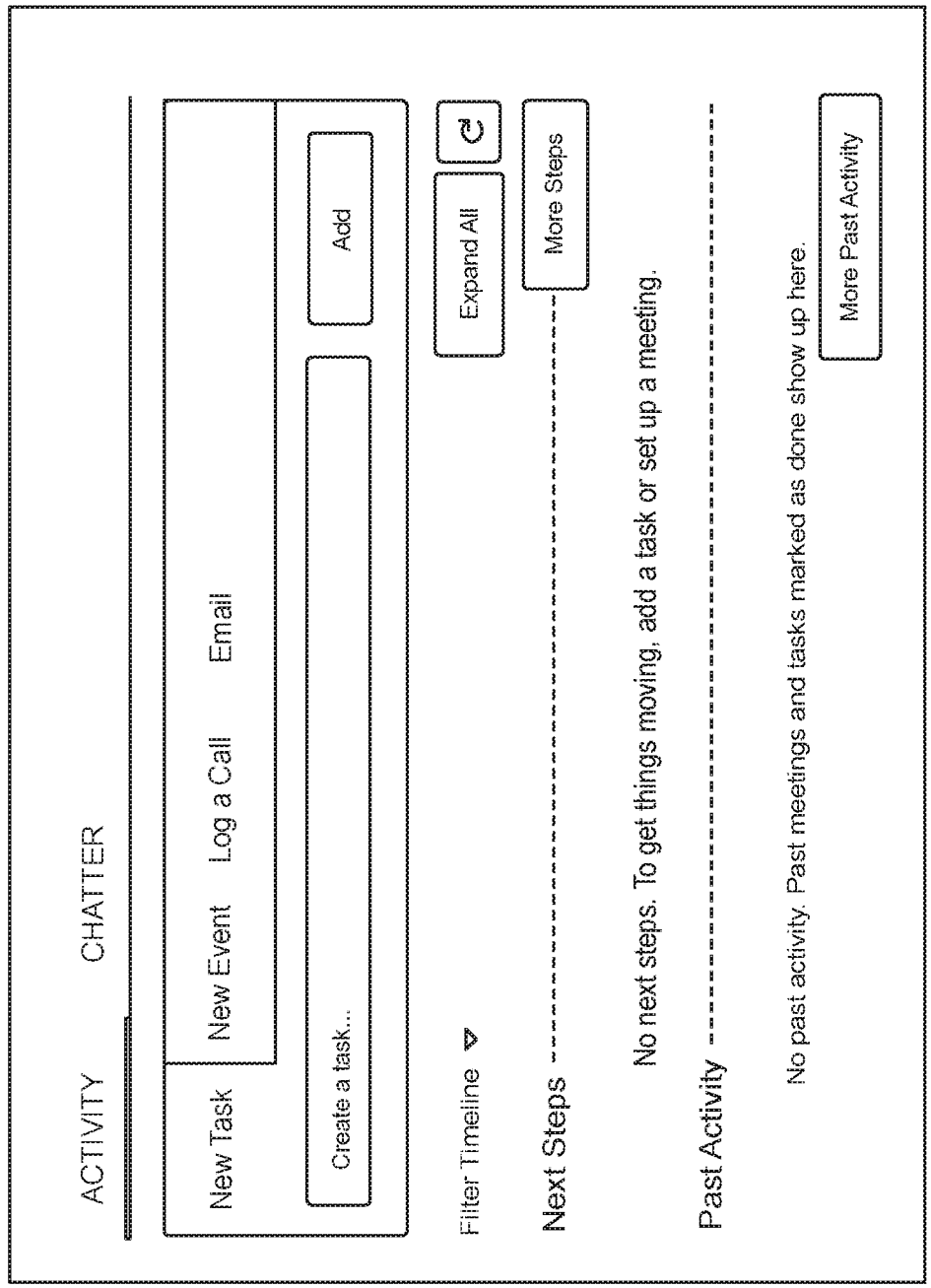
FIG. 7G is a screenshot that shows an example of the organization activity timeline for notifications@github.com after an administrator adds the external domain github.com to the organization-level external domain blacklist in accordance with the disclosed embodiments.

FIG. 7F is a screenshot that shows an example of an organization activity timeline for notifications@github.com before an administrator adds the external domain github.com to an organization-level external domain blacklist in accordance with the disclosed embodiments. The organization activity timeline includes various activities collectively shown as 790. FIG. 7G is a screenshot that shows the organization activity timeline for notifications@github.com after the administrator adds the external domain github.com to the organization-level external domain blacklist, and that all of the activities from FIG. 7F have been hard-deleted.

Figure 7H:
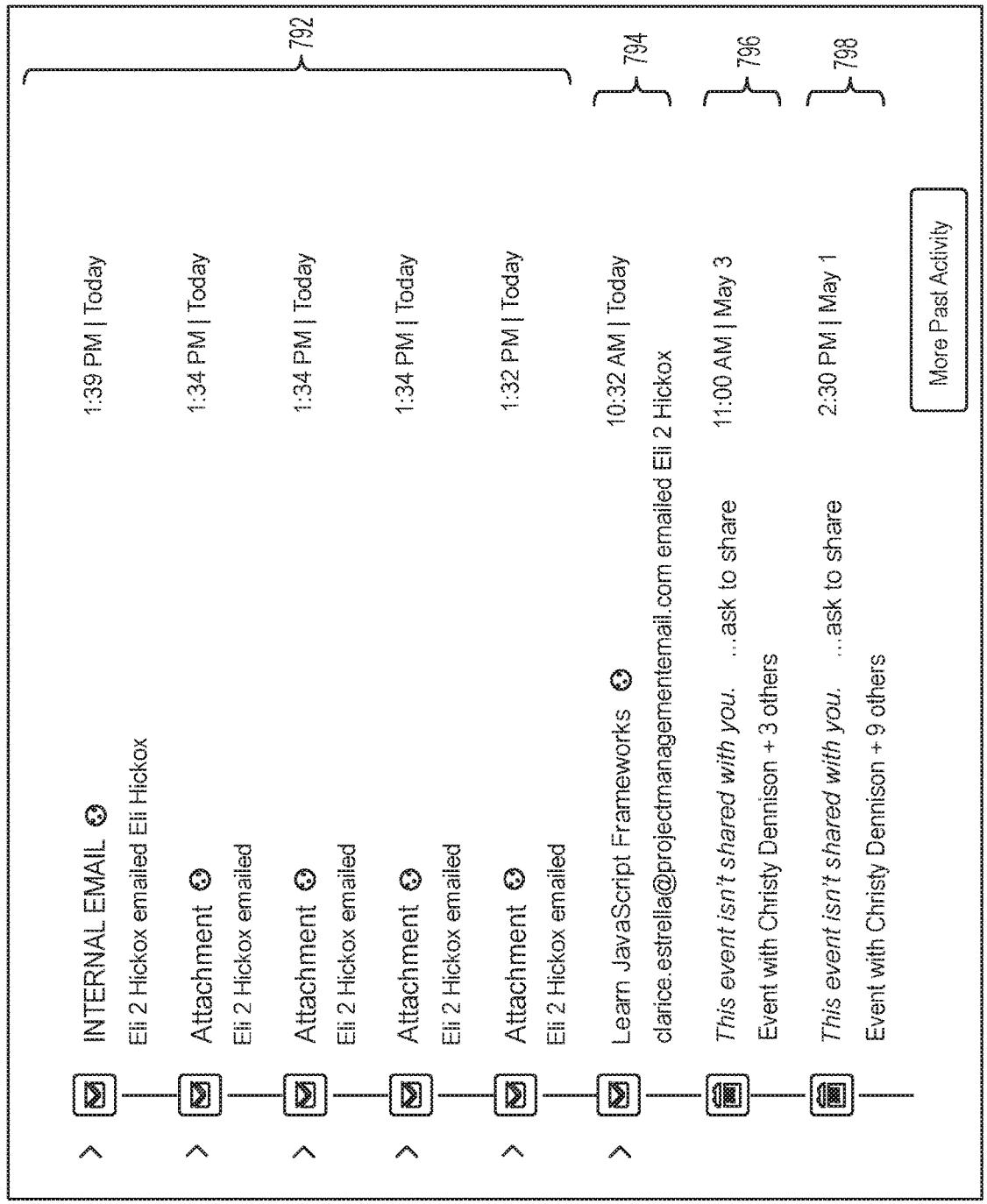
FIG. 7H is a screenshot that shows an example of an organization activity timeline for eli@salesforceiq.com before an administrator adds the internal domain salesforceiq.com to an organization-level internal domain blacklist in accordance with the disclosed embodiments.

FIG. 7H is a screenshot that shows an example of an organization activity timeline for eli@salesforceiq.com before an administrator adds the internal domain salesforceiq.com to an organization-level internal domain blacklist in accordance with the disclosed embodiments. As shown in FIG. 7H, the organization activity timeline includes various activities including five emails collectively shown as 792, an email 794, and two meetings 796, 798. When a new internal domain salesforceiq.com is added to the organization-level internal domain blacklist by the administrator, this triggers evaluation of past activities against the organization-level internal domain blacklist so that activities can be removed or "scrubbed from" the organization activity timeline. As described above, the past activity scrubber 332 can evaluate each activity in the organization activity timeline against the organization-level internal domain blacklist to determine whether all contributions to this activity have an internal domain salesforceiq.com or any number of aliases of that internal domain salesforceiq.com that are specified the organization-level internal domain blacklist. In this example, it is assumed that for each of the activities shown in FIG. 7H, except activity 794, the past activity scrubber 332 determines (at 754) that all contributions to this activity have an internal domain salesforceiq.com. By contrast, it is assumed in this example, that the past activity scrubber 332 has determined that all contributions to activity 794 do not have an internal domain salesforceiq.com.

FIG. 7I is a screenshot that shows an example of the organization activity timeline for eli@salesforceiq.com after an administrator adds the internal domain salesforceiq.com to the organization-level internal domain blacklist in accordance with the disclosed embodiments. As shown in FIG. 7I, the past activity scrubber 332 has performed a hard-delete and removed the activities 792, 796, 798 from the organization activity timeline so that the activities 792, 796, 798 no longer appears in the organization activity timeline, but allows the activity 794 and all contributions to the activity to continue to appear in the organization activity timeline. Because the activities 792, 796, 798 are hard-deleted the activities 792, 796, 798 are not allowed to be retroactively added back into the organization activity timeline at a later time.

The following description is of one example of a system in which the features described above may be implemented. The components of the system described below are merely one example and should not be construed as limiting. The features described above with respect to FIGS. 1-7I may be implemented in any other type of computing environment, such as one with multiple servers, one with a single server, a multi-tenant server environment, a single-tenant server environment, or some combination of the above.

Figure 8:
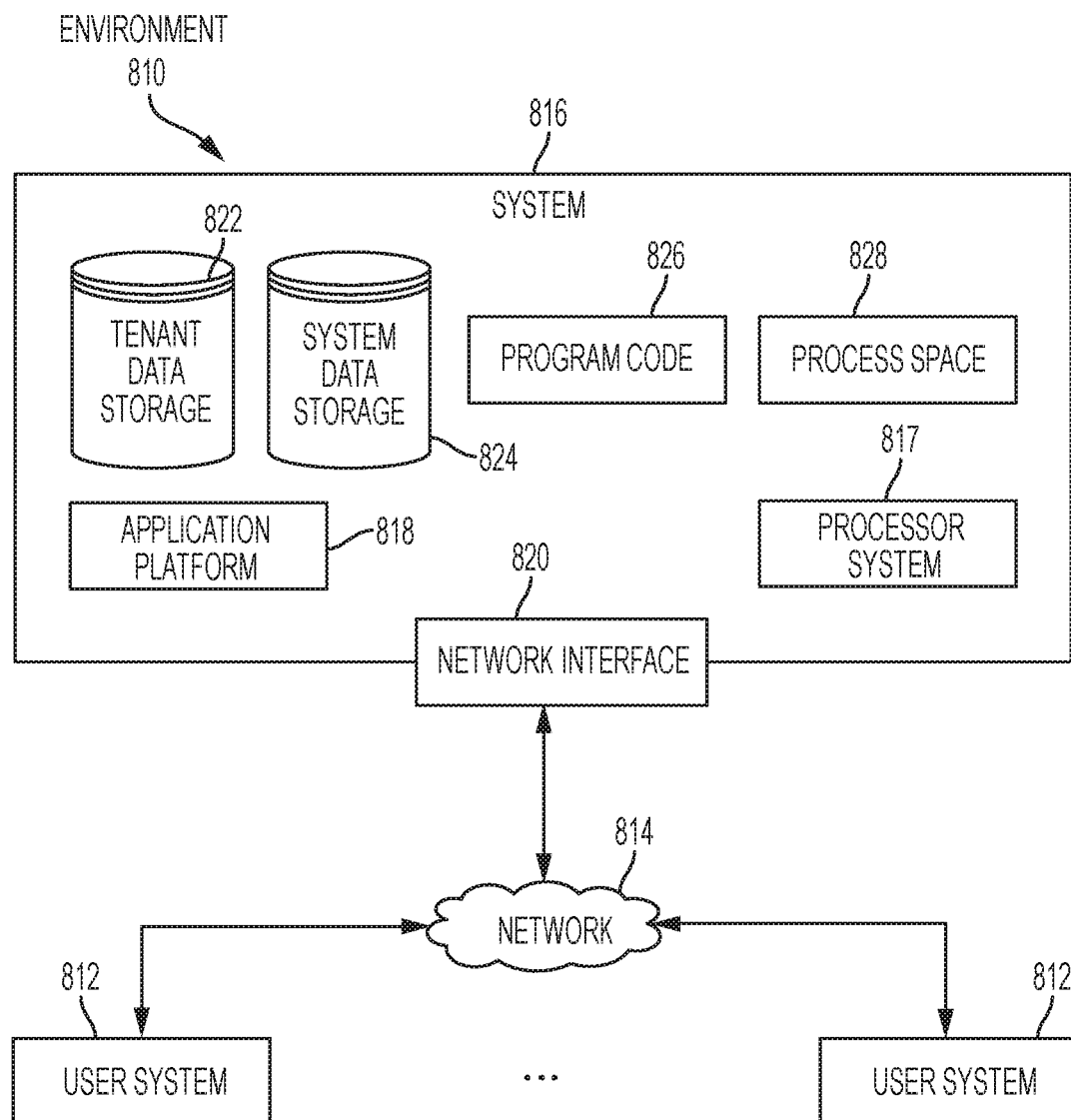
FIG. 8 shows a block diagram of an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
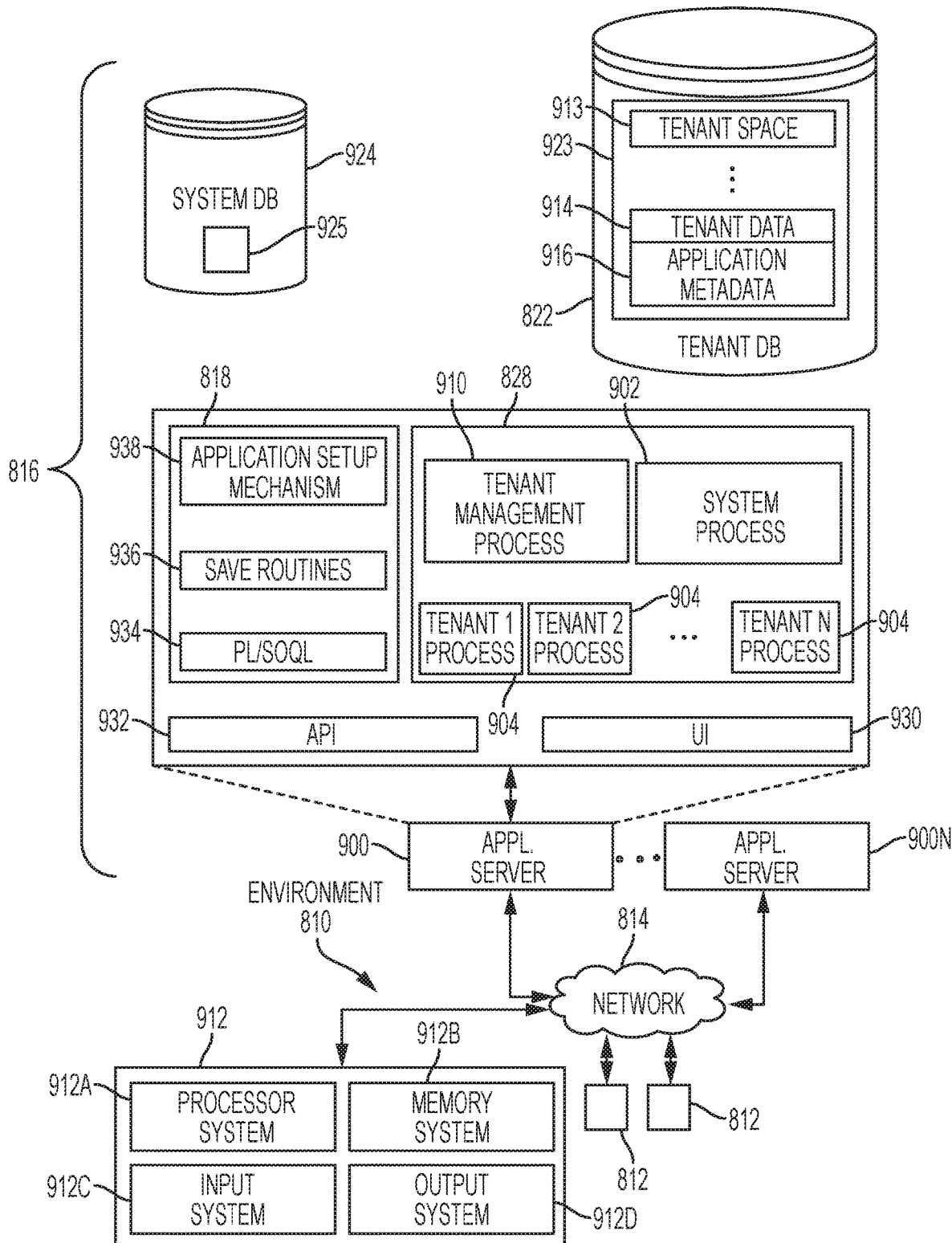
FIG. 9 shows a block diagram of example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 810, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 820 of FIG. 8 is implemented as a set of HTTP application servers $900_1$-$1400_N$. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server $900_1$ can be coupled via the network 814 (for example, the Internet), another application server $900_N$ can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are sharable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database. The term "query plan" generally may refer to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
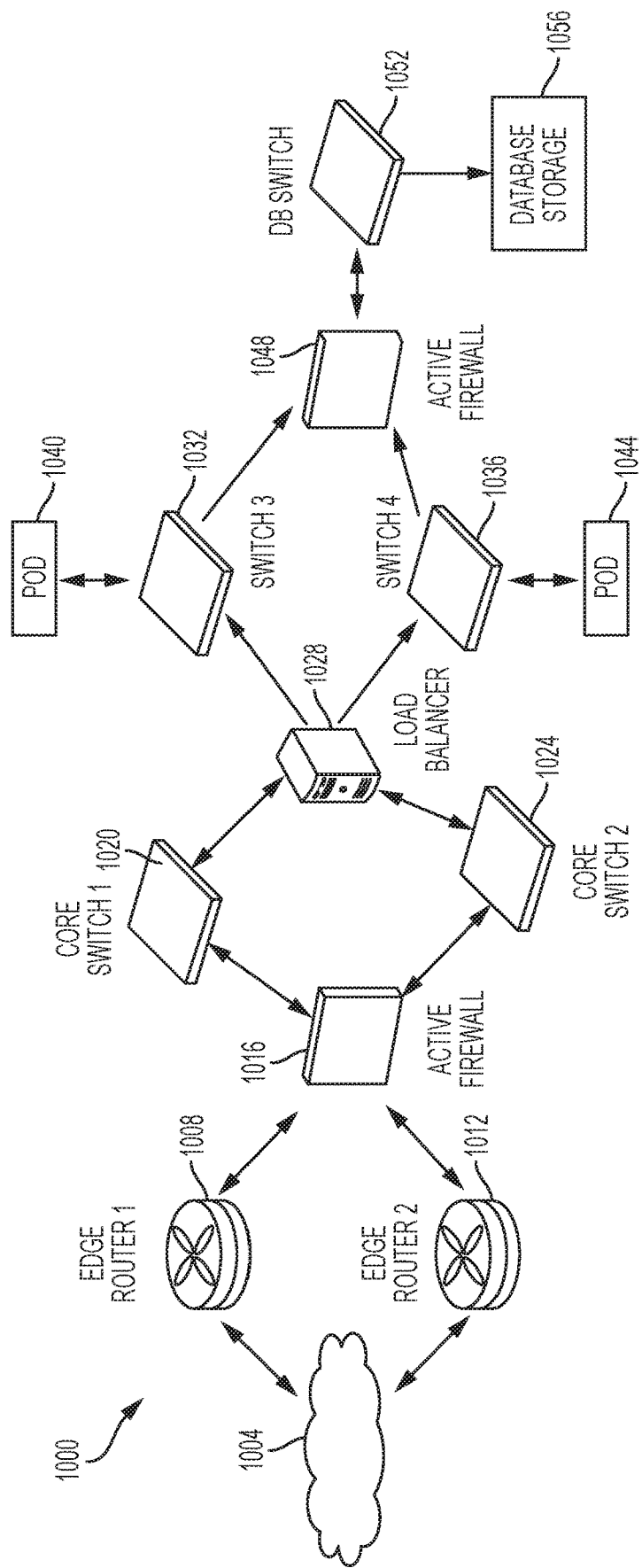
FIG. 10A shows a system diagram illustrating example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
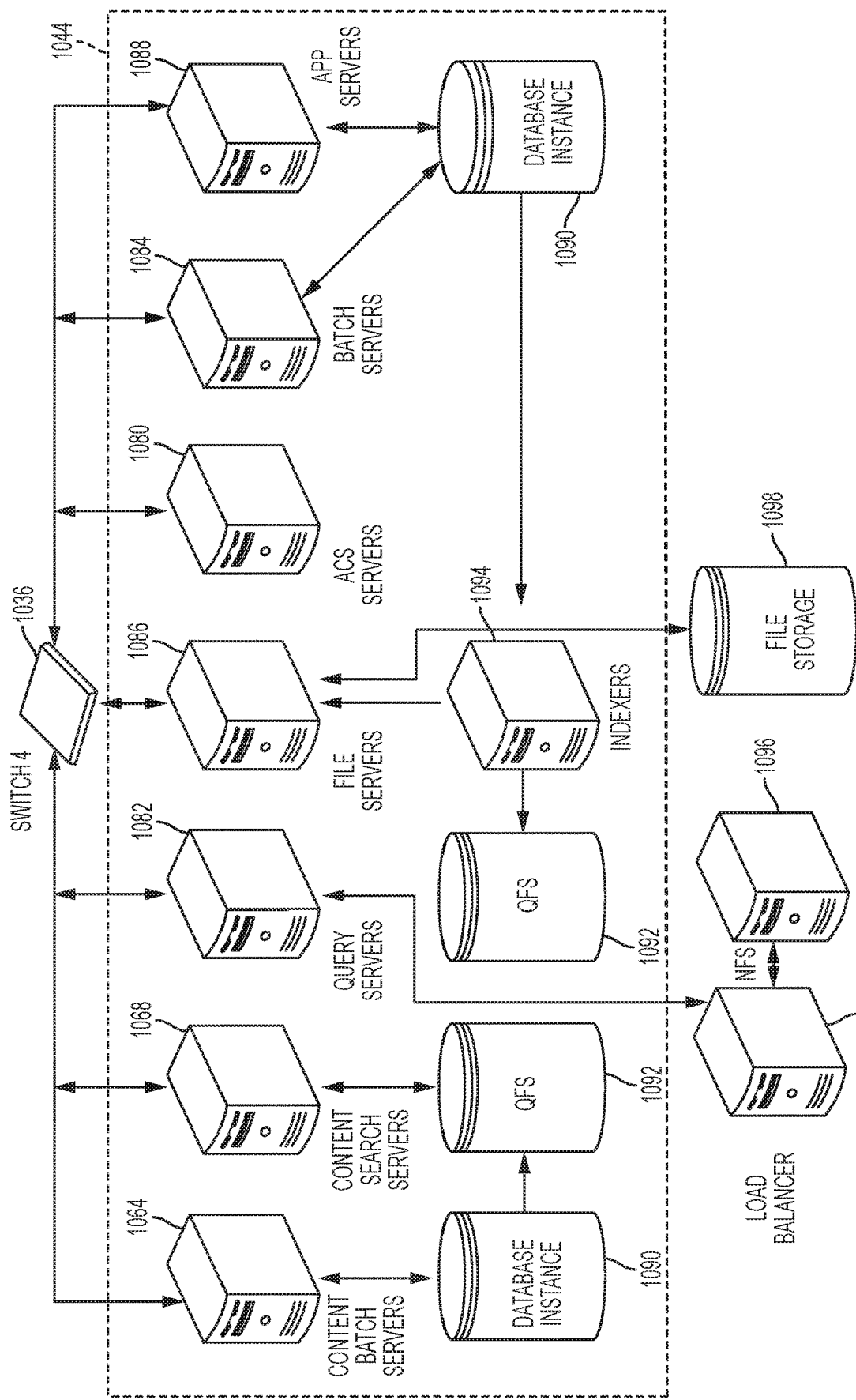
FIG. 10B shows a system diagram further illustrating example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, Calif. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
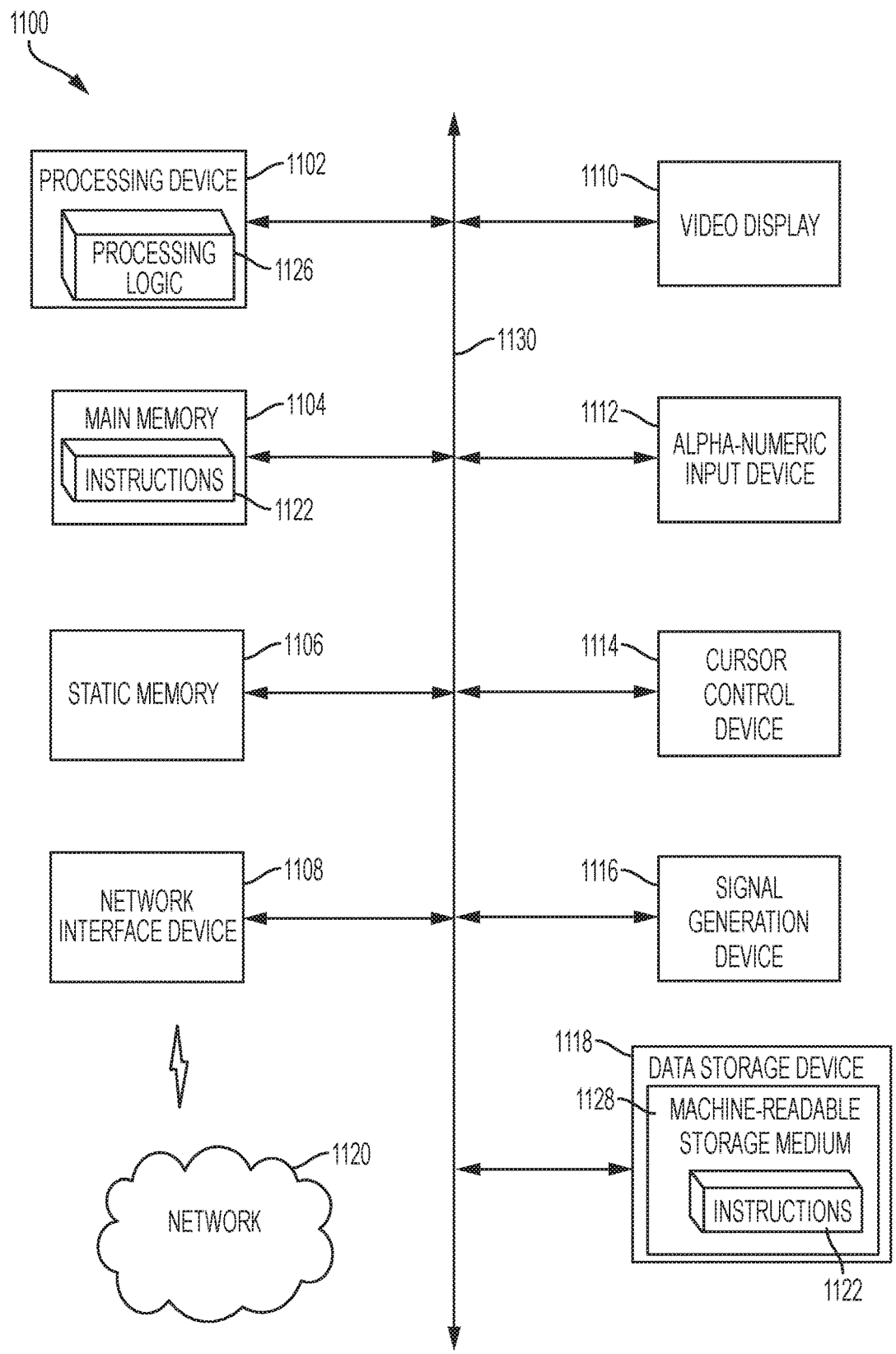
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for controlling which contributions are displayed in an organization activity timeline of an organization, wherein the organization activity timeline is a visual component displayed within a user interface that shows activities involving a particular external contact and one or more users of the organization, the method comprising:
adding an identifier to a user-level blacklist wherein the identifier is associated with the particular external contact and is specified by a user of the organization;
determining whether the user and the particular external contact are the only participants for a new activity created for the organization activity timeline or if there are other contributors to the new activity who are also participants, wherein the new activity includes the identifier from the user-level blacklist;
when the user and the particular external contact are the only participants for the new activity created for the organization activity timeline;
blocking the new activity from appearing in the organization activity timeline so that the new activity with the particular external contact does not appear in the organization activity timeline to other users of the organization: and when the user and the particular external contact are not the only participants for the new activity created for the organization activity timeline and there are other contributors to the new activity who are also participants;
blocking only the user's contribution to the new activity from appearing in the organization activity timeline so that the user's contribution to the new activity does not appear in the organization activity timeline to other users of the organization; and
continuing to allow other contributions from the other users of the organization to the new activity to remain and appear in the organization activity timeline.

2. A method according to claim 1, wherein the organization activity timeline comprises a chronological record of activities each having at least one contributor that is a user from the organization.

3. A method according to claim 1, wherein each activity comprises: a recording of a communication between one or more users of the organization and a particular external contact, and wherein the communication comprises:
an email;
a calendar meeting;
a phone call;
a task;
a note;
a change to an internal representation of an external person; or
an internal representation of a need or change of that need to follow-up with an external person.

4. A method according to claim 1, wherein the identifier comprises:
any identifier associated with the particular external contact that can be used to identify that particular external contact.

5. A computing system for controlling which contributions are displayed in an organization activity timeline of an organization, the computing system comprising:
a distributed database management system (DDMS) configured to store a user-level blacklist including at least one identifier that is associated with the particular external contact and that was added in to the user-level blacklist by a user of the organization;
an organization activity timeline generator configured to generate the organization activity timeline for the organization, wherein the organization activity timeline is a visual component displayed within a user interface that shows activities involving a particular external contact and one or more users of the organization, wherein the organization activity timeline generator comprises:
a real-time activity evaluator configured to ingest a new activity received from data sources of the use;
determine whether the user and the particular external contact are the only participants for a new activity created for the organization activity timeline or if there are other contributors to the new activity who are also participants, wherein the new activity includes the identifier from the user-level blacklist;
when the user and the particular external contact are the only participants for the new activity created for the organization activity timeline;
block the new activity from appearing in the organization activity timeline so that the new activity with the particular external contact does not appear in the organization activity timeline to other users of the organization; and
when the user and the particular external contact are not the only participants for the new activity created for the organization activity timeline and there are other contributors to the new activity who are also participants;
block only the user's contribution to the new activity from appearing in the organization activity timeline so that the user's contribution to the new activity does not appear in the organization activity timeline to other users of the organization; and
continue to allow other contributions from the other users of the organization to the new activity to remain and appear in the organization activity timeline.

6. A computing system according to claim 5, wherein the organization activity timeline comprises a chronological record of activities each having at least one contributor that is a user from the organization.

7. A computing system according to claim 5, wherein each activity comprises: a recording of a communication between one or more users of the organization and a particular external contact, and wherein the communication comprises:
an email;
a calendar meeting; a phone call; a task; a note;
a change to an internal representation of an external person; or an internal representation of a need or change of that need to follow-up with an external person.

8. A computing system comprising a processor and a memory, wherein the memory comprises computer-executable instructions that are capable of execution by the processor, and that when executed by the processor, cause the computing system to:

control, which contributions are displayed in an organization activity timeline of an organization, wherein the organization activity timeline is a visual component displayed within a user interface that shows activities involving a particular external contact and one or more users of the organization;

add an identifier to a user-level blacklist;

process a new activity to determine whether the new activity includes the identifier from the user-level blacklist wherein the identifier is associated with the particular external contact and is specified by a user of the organization:

determine, when the new activity includes the identifier from the user-level blacklist whether the user and the particular external contact are the only participants for the new activity created for an organization activity timeline of the organization or if there are other contributors to the new activity who are also participants;

when the user and the particular external contact are the only participants for the new activity created for the organization activity timeline;

block the new activity from appearing in the organization activity timeline so that the new activity with the particular external contact does not appear in the organization activity timeline to other users of the organization; and when the user and the particular external contact are not the only participants for the new activity created for the organization activity timeline and there are other contributors to the new activity who are also participants;

block only the user's contribution to the new activity from appearing in the organization activity timeline so that the user's contribution to the new activity does not appear in the organization activity timeline to other users of the organization; and continue to allow other contributions from the other users of the organization to the new activity to remain and appear in the organization activity timeline.

\* \* \* \* \*